(12) United States Patent
Mori et al.

(10) Patent No.: US 7,165,265 B2
(45) Date of Patent: Jan. 16, 2007

(54) BROADCAST RECEPTION APPARATUS FOR OBTAINING AND STORING HIGH-USE-POSSIBILITY REPRODUCTION PROGRAMS BEFOREHAND

(75) Inventors: Toshiya Mori, Settsu (JP); Akihiro Tanaka, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 926 days.

(21) Appl. No.: 09/797,235

(22) Filed: Mar. 1, 2001

(65) Prior Publication Data

US 2002/0124270 A1  Sep. 5, 2002

(30) Foreign Application Priority Data

Mar. 1, 2000  (JP)  ............................... 2000-056410

(51) Int. Cl.
*H04N 7/173* (2006.01)
(52) U.S. Cl. ..................... 725/89; 725/39; 725/46; 725/131; 725/139
(58) Field of Classification Search ................. 725/46, 725/131, 132, 139, 140, 151, 152, 39, 89
See application file for complete search history.

(56) References Cited

U.S. PATENT DOCUMENTS

| | | | | |
|---|---|---|---|---|
| 5,848,396 A | * | 12/1998 | Gerace | 705/10 |
| 5,990,881 A | * | 11/1999 | Inoue et al. | 715/720 |
| 5,991,306 A | * | 11/1999 | Burns et al. | 370/429 |
| 6,157,948 A | * | 12/2000 | Inoue et al. | 709/219 |
| 6,298,482 B1 | * | 10/2001 | Seidman et al. | 725/101 |
| 6,337,715 B1 | * | 1/2002 | Inagaki et al. | 348/553 |
| 6,357,043 B1 | * | 3/2002 | Ellis et al. | 725/61 |
| 6,442,755 B1 | * | 8/2002 | Lemmons et al. | 725/47 |
| 6,445,306 B1 | * | 9/2002 | Trovato et al. | 340/825.24 |
| 6,470,497 B1 | * | 10/2002 | Ellis et al. | 725/39 |
| 6,532,591 B1 | * | 3/2003 | Arai et al. | 725/132 |
| 6,608,633 B1 | * | 8/2003 | Sciammarella et al. | 715/700 |
| 6,614,843 B1 | * | 9/2003 | Gordon et al. | 375/240.01 |
| 6,681,395 B1 | * | 1/2004 | Nishi | 725/45 |
| 6,751,401 B1 | * | 6/2004 | Arai et al. | 386/83 |
| 6,898,801 B1 | * | 5/2005 | Haraoka et al. | 725/151 |
| 7,032,236 B1 | * | 4/2006 | Ozkan et al. | 725/39 |
| 2002/0019979 A1 | * | 2/2002 | Koreeda et al. | 725/39 |

FOREIGN PATENT DOCUMENTS

| | | | |
|---|---|---|---|
| JP | 9-214445 | | 8/1997 |
| WO | WO 99/43158 | * | 8/1999 |

* cited by examiner

*Primary Examiner*—Chris Kelley
*Assistant Examiner*—Son P. Huynh

(57) ABSTRACT

The program-for-cache determining unit 107 counts the number of contents (a corresponding contents number) that are to use reproduction programs, for each reproduction program transmitted over each channel during the current service period and onward up to the last service period shown in the broadcast information, and determines a reproduction program that has the highest corresponding contents number, as the one to be cached. The program-for-cache determining unit 107 also determines the service period and channel during and over which the determined reproduction program is to be cached. The cache unit 108 instructs the demultiplexing/decoding unit 104 to demultiplex and decode the reproduction program corresponding to the determined channel and store it in the reproduction program storage unit 109.

25 Claims, 30 Drawing Sheets

FIG. 3

| PID | FORMAT |
|---|---|
| 1 | XML |
| 2 | HTML |
| 3 | JAVA |
| 4 | DVX |

FIG. 4

| SID | CID | PID | SERVICE PERIOD | CHANNEL |
|---|---|---|---|---|
| 1 | 1 | 1 | 5:00—7:00 | 1 |
| 2 | 2 | 2 | 5:00—7:00 | 2 |
| 3 | 3 | 3 | 5:00—7:00 | 3 |
| 4 | 4 | 4 | 5:00—7:00 | 4 |
| 5 | 5 | 2 | 7:00—9:00 | 1 |
| 6 | 6 | 2 | 7:00—9:00 | 2 |
| 7 | 7 | 3 | 7:00—9:00 | 3 |
| 8 | 8 | 1 | 7:00—9:00 | 4 |
| 9 | 9 | 1 | 9:00—11:00 | 1 |
| 10 | 10 | 4 | 9:00—11:00 | 2 |
| 11 | 11 | 2 | 9:00—11:00 | 3 |
| 12 | 12 | 3 | 9:00—11:00 | 4 |
| 13 | 13 | 2 | 11:00—13:00 | 1 |
| 14 | 14 | 1 | 11:00—13:00 | 2 |
| 15 | 15 | 2 | 11:00—13:00 | 3 |
| 16 | 16 | 3 | 11:00—13:00 | 4 |
| 17 | 17 | 4 | 13:00—15:00 | 1 |
| 18 | 18 | 2 | 13:00—15:00 | 2 |
| 19 | 19 | 3 | 13:00—15:00 | 3 |
| 20 | 20 | 4 | 13:00—15:00 | 4 |
| 21 | 21 | 1 | 15:00—17:00 | 1 |
| 22 | 22 | 1 | 15:00—17:00 | 2 |
| 23 | 23 | 2 | 15:00—17:00 | 3 |
| 24 | 24 | 4 | 15:00—17:00 | 4 |
| 25 | 25 | 2 | 17:00—19:00 | 1 |
| 26 | 26 | 3 | 17:00—19:00 | 2 |
| 27 | 27 | 1 | 17:00—19:00 | 3 |
| 28 | 28 | 4 | 17:00—19:00 | 4 |
| 29 | 29 | 2 | 19:00—21:00 | 1 |
| 30 | 30 | 2 | 19:00—21:00 | 2 |
| 31 | 31 | 1 | 19:00—21:00 | 3 |
| 32 | 32 | 3 | 19:00—21:00 | 4 |
| 33 | 33 | 4 | 21:00—23:00 | 1 |
| 34 | 34 | 2 | 21:00—23:00 | 2 |
| 35 | 35 | 1 | 21:00—23:00 | 3 |
| 36 | 36 | 2 | 21:00—23:00 | 4 |

FIG.10

| PID | CORRESPONDING CONTENTS NUMBER |
|---|---|
| 1 | 9 |
| 2 | 13 |
| 3 | 7 |
| 4 | 7 |

FIG.11

| PID=2 | |
|---|---|
| SERVICE PERIOD | CHANNEL |
| 5:00—7:00 | 2 |
| 7:00—9:00 | 1, 2 |
| 9:00—11:00 | 3 |
| 11:00—13:00 | 1, 3 |
| 13:00—15:00 | 2 |
| 15:00—17:00 | 3 |
| 17:00—19:00 | 1 |
| 19:00—21:00 | 1, 2 |
| 21:00—23:00 | 2, 4 |

FIG.13

| SERVICE PERIOD | PID |
|---|---|
| 5:00−7:00 | 1,2,3,4 |
| 7:00−9:00 | 2,2,3,1 |
| 9:00−11:00 | 1,4,2,3 |
| 11:00−13:00 | 2,1,2,3 |
| 13:00−15:00 | 4,2,3,4 |
| 15:00−17:00 | 1,1,2,4 |
| 17:00−19:00 | 2,3,1,4 |
| 19:00−21:00 | 2,2,1,3 |
| 21:00−23:00 | 4,2,1,2 |

FIG. 15

| PID | CORRESPONDING CONTENTS NUMBER |
|---|---|
| 1 | 2 |
| 2 | 5 |
| 3 | 1 |
| 4 | 1 |

FIG.16

| SID | CID | PID | SERVICE PERIOD | CHANNEL | JID |
|---|---|---|---|---|---|
| 1 | 1 | 1 | 5:00−7:00 | 1 | 1 |
| 2 | 2 | 2 | 5:00−7:00 | 2 | 7 |
| 3 | 3 | 3 | 5:00−7:00 | 3 | 3 |
| 4 | 4 | 4 | 5:00−7:00 | 4 | 2 |
| 5 | 5 | 2 | 7:00−9:00 | 1 | 4 |
| 6 | 6 | 2 | 7:00−9:00 | 2 | 4 |
| 7 | 7 | 3 | 7:00−9:00 | 3 | 5 |
| 8 | 8 | 1 | 7:00−9:00 | 4 | 6 |
| 9 | 9 | 1 | 9:00−11:00 | 1 | 7 |
| 10 | 10 | 4 | 9:00−11:00 | 2 | 7 |
| 11 | 11 | 2 | 9:00−11:00 | 3 | 5 |
| 12 | 12 | 3 | 9:00−11:00 | 4 | 2 |
| 13 | 13 | 2 | 11:00−13:00 | 1 | 1 |
| 14 | 14 | 1 | 11:00−13:00 | 2 | 3 |
| 15 | 15 | 2 | 11:00−13:00 | 3 | 2 |
| 16 | 16 | 3 | 11:00−13:00 | 4 | 4 |
| 17 | 17 | 4 | 13:00−15:00 | 1 | 4 |
| 18 | 18 | 2 | 13:00−15:00 | 2 | 1 |
| 19 | 19 | 3 | 13:00−15:00 | 3 | 7 |
| 20 | 20 | 4 | 13:00−15:00 | 4 | 2 |
| 21 | 21 | 1 | 15:00−17:00 | 1 | 2 |
| 22 | 22 | 1 | 15:00−17:00 | 2 | 3 |
| 23 | 23 | 2 | 15:00−17:00 | 3 | 1 |
| 24 | 24 | 4 | 15:00−17:00 | 4 | 2 |
| 25 | 25 | 2 | 17:00−19:00 | 1 | 4 |
| 26 | 26 | 3 | 17:00−19:00 | 2 | 7 |
| 27 | 27 | 1 | 17:00−19:00 | 3 | 6 |
| 28 | 28 | 4 | 17:00−19:00 | 4 | 6 |
| 29 | 29 | 2 | 19:00−21:00 | 1 | 3 |
| 30 | 30 | 2 | 19:00−21:00 | 2 | 5 |
| 31 | 31 | 1 | 19:00−21:00 | 3 | 2 |
| 32 | 32 | 3 | 19:00−21:00 | 4 | 1 |
| 33 | 33 | 4 | 21:00−23:00 | 1 | 4 |
| 34 | 34 | 2 | 21:00−23:00 | 2 | 2 |
| 35 | 35 | 1 | 21:00−23:00 | 3 | 2 |
| 36 | 36 | 2 | 21:00−23:00 | 4 | 5 |

FIG. 17

| JID | GENRE OF CONTENTS |
|---|---|
| 1 | QUIZ PROGRAM |
| 2 | WEATHER REPORT PROGRAM |
| 3 | EDUCATION PROGRAM |
| 4 | NEWS PROGRAM |
| 5 | SHOPPING PROGRAM |
| 6 | SPORTS PROGRAM |
| 7 | MUSIC PROGRAM |

FIG. 19

| JID=2, 3 | |
|---|---|
| PID | CORRESPONDING CONTENTS NUMBER |
| 1 | 5 |
| 2 | 3 |
| 3 | 2 |
| 4 | 4 |

FIG.20

| JID=1 | |
|---|---|
| SERVICE PERIOD | CHANNEL |
| 5:00−7:00 | 1 |
| 7:00−9:00 | 4 |
| 9:00−11:00 | 1 |
| 11:00−13:00 | 2 |
| 13:00−15:00 | |
| 15:00−17:00 | 1, 2 |
| 17:00−19:00 | 3 |
| 19:00−21:00 | 3 |
| 21:00−23:00 | 3 |

FIG. 22

| SID = 1, 8, 15, 20, 24, 29, 35 ||
| PID | CORRESPONDING CONTENTS NUMBER |
| --- | --- |
| 1 | 3 |
| 2 | 2 |
| 3 | 0 |
| 4 | 2 |

FIG. 23

| PID | THE NUMBER OF CACHING |
| --- | --- |
| 1 | 9 |
| 2 | 4 |
| 3 | 5 |
| 4 | 12 |

| JID=4 | |
|---|---|
| SERVICE PERIOD | CHANNEL |
| 5:00—7:00 | 4 |
| 7:00—9:00 | — |
| 9:00—11:00 | 2 |
| 11:00—13:00 | — |
| 13:00—15:00 | 1, 4 |
| 15:00—17:00 | 4 |
| 17:00—19:00 | 4 |
| 19:00—21:00 | — |
| 21:00—23:00 | 1 |

FIG. 28

| RAM STORAGE CAPACITY=140K, UNALLOCATED SPACE=20K | ROM STORAGE CAPACITY=140K, UNALLOCATED SPACE=100K |
|---|---|
| PID=2, CORRESPONDING CONTENTS NUMBER=3, SIZE=50K<br>PID=1, CORRESPONDING CONTENTS NUMBER=4, SIZE=70K | PID=4, CORRESPONDING CONTENTS NUMBER=1, SIZE=40K |

FIG. 30

| RAM STORAGE CAPACITY=140K, UNALLOCATED SPACE=20K | ROM STORAGE CAPACITY=140K, UNALLOCATED SPACE=100K |
|---|---|
| PID=2, ACTIVATION DURATION=3sec, SIZE=50K<br>PID=1, ACTIVATION DURATION=4sec, SIZE=70K | PID=4, ACTIVATION DURATION=1sec, SIZE=40K |

FIG. 32

| RAM STORAGE CAPACITY=140K, UNALLOCATED SPACE=20K | ROM STORAGE CAPACITY=140K, UNALLOCATED SPACE=100K |
|---|---|
| PID=2, CORRESPONDING CONTENTS NUMBER=4, SIZE=50K<br>PID=1, CORRESPONDING CONTENTS NUMBER=2, SIZE=70K | PID=4, CORRESPONDING CONTENTS NUMBER=1, SIZE=40K<br>PID=1, CORRESPONDING CONTENTS NUMBER=3, SIZE=80K |

BROADCAST RECEPTION APPARATUS FOR OBTAINING AND STORING HIGH-USE-POSSIBILITY REPRODUCTION PROGRAMS BEFOREHAND

BACKGROUND OF THE INVENTION (1) Field of the Invention

The present invention relates to a broadcast reception apparatus. More particularly, the present invention relates to a broadcast reception apparatus which obtains and stores high-use-possibility reproduction programs, in advance.

(2) Description of Related Art

In digital broadcasting, to provide appropriate representation of broadcast programs, it is desirable that broadcast stations generate various formats of data (hereinafter called contents) for the broadcast programs. It is desirable, for example, that the contents are generated using any formats out of HTML, XML, DVX, and JAVA according to the story or scenario of the broadcast programs, and similarly, that the contents are compressed using any of a plurality of compression methods according to the story or scenario of the broadcast programs.

When the contents are generated as described above, broadcast reception apparatuses that receive and reproduce the contents require reproduction programs for all types of contents. This would be possible, but is not realistic since the broadcast reception apparatuses would need a large capacity of storage.

One solution to the above problem is that broadcasting apparatuses in the broadcast stations transmit the contents together with the reproduction programs used for reproducing the contents, by a time-division multiplexing method. FIG. 1 shows time-division-multiplexed data transmitted by a broadcasting apparatus. As shown in FIG. 1, a reproduction program is repeatedly transmitted between pieces of contents-part data. The reproduction program is transmitted at every period T so that the broadcast reception apparatus can start reproducing from some midpoint in the contents as it starts receiving.

Broadcast reception apparatuses receive the contents together with reproduction programs, while reproducing the received contents using the received reproduction programs.

This enables the broadcast reception apparatuses to reproduce the contents that are generated with a variety of types of formats and transmitted by broadcasting apparatuses, without storing the reproduction programs in advance.

There is a problem, however, in the above-described transmission method. That is to say, if contents-part data is received first, viewers must wait some time before viewing the contents until a reproduction program for the contents-part data is received.

Suppose that the channel is selected, for example, at time t1 as shown in FIG. 1, then it takes time period $\Delta t$ before the reproduction program is completely received. Furthermore, it takes time period $\alpha$ before the reproduction program is activated. As a result, the contents of the program provided over the selected channel is not reproduced for a time period, $\Delta t + \alpha$. This might cause the viewer to become suspicious or worry about the viewing. Even though it is possible to reduce the waiting time by reducing the period T and the period $\Delta t$, it also decreases the transmission rate of the contents data. Accordingly, this is not an appropriate method.

SUMMARY OF THE INVENTION

It is therefore an object of the present invention to provide a broadcasting apparatus, a broadcast reception apparatus, a broadcasting method, and a broadcast reception method that can reduce a delay before a received content, which is reproduced by executing a corresponding reproduction program, is reproduced.

The above object is fulfilled by a broadcast reception apparatus for receiving contents and reproduction programs that correspond to types of the contents, and reproducing the contents by executing the reproduction programs, the broadcast reception apparatus comprising: a receiving means for receiving broadcast information which shows for each content a set of a service period and a channel during and over which the content is transmitted, and also shows for each reproduction program a set of a service period and a channel during and over which the reproduction program is transmitted; a reproduction program determining means for determining a reproduction program to be cached; an identifying means for identifying, by referring to the broadcast information, one or more sets of a service period and a channel during and over which the predicted reproduction program is to be transmitted after a current time; and a caching means for allowing the receiving means to receive the predicted reproduction program during and over the service periods and channels identified by the identifying means, and storing the received reproduction program in a reproduction program storage means.

With the above construction, the broadcast reception apparatus obtains a reproduction program with a high possibility of being used in future. Accordingly, when a content selected by the viewer is actually reproduced with the obtained reproduction program in future (i.e., the prediction proves to be right), a delay in reproducing the content is reduced by a time required for obtaining the corresponding reproduction program, compared to a method in which a reproduction program is obtained together with the corresponding content.

In the above broadcast reception apparatus, the broadcast information further may show correspondence between the reproduction programs and the contents, and also shows genres to which the contents belong, the reproduction program determining means includes: a storage means for storing history information that shows history of genres to which contents having been viewed belong; a contents identifying means for identifying, by referring to the history information, genres that correspond to contents that have been viewed a predetermined number of times or more, and identifying, by referring to the broadcast information, contents that belong to the identified genres, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program prior to the broadcast of the corresponding content which is to be broadcast and belongs to a genre that has been viewed a high number of times. Accordingly, since the genre that has been viewed a high number of times has a high possibility of being viewed, it is possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the contents identifying means may identify, as viewing candidate contents, contents that are transmitted during a predetermined time period after the current time, among the viewing candidate contents having been identified.

With the above construction, the broadcast reception apparatus obtains a reproduction program prior to the broadcast of the corresponding content which is to be broadcast after the current time.

In the above broadcast reception apparatus, the determining means, when there are a plurality of candidate reproduction programs, may determine preferentially a candidate reproduction program that corresponds to the highest number of viewing candidate contents, as the reproduction program to be cached.

With the above construction, when there are a plurality of candidate reproduction programs and the candidate reproduction programs correspond to a plurality of contents, a reproduction program having the highest corresponding contents number is preferentially selected. Here, when each viewing candidate content has the same probability of being viewed, the higher the corresponding contents number is, the higher possibility of being used the corresponding reproduction program has. It is therefore possible to predict a reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between types of the reproduction programs and the contents, and the caching means refers to the broadcast information and counts, for each corresponding type of reproduction program having been received, the number of contents that are to be transmitted after the current time, and stores preferentially into the volatile memory a type of reproduction program having the highest number of corresponding contents.

With the above construction, when a reproduction program is cached, it is possible to predict that the higher the corresponding contents number is, the higher possibility of being used the reproduction program has. It is therefore possible to predict a reproduction program having a high possibility of being used and store the reproduction program in the volatile memory. When the prediction proves to be right, the reproduction program is accessed faster than it is stored in the nonvolatile memory. Accordingly, a delay in reproducing the content is reduced by a time difference between the access times for the volatile and nonvolatile memories.

In the above broadcast reception apparatus, the caching means may detect activation duration for each received reproduction program, and stores preferentially a reproduction program having the longest activation duration into the volatile memory.

With the above construction, a reproduction program having the longest activation duration is stored in the volatile memory that can be accessed fast. If the reproduction program was stored in the nonvolatile memory, the delay in reproduction would be extended by the time difference between the access times for the volatile and nonvolatile memories. Accordingly, the present invention prevents the delay from being extended.

In the above broadcast reception apparatus, the broadcast information may further show correspondence between the reproduction programs and the contents, and the caching means refers to the broadcast information and counts, for each corresponding reproduction program having been received, the number of contents that are to be transmitted during the current service period and onward, and stores preferentially into the volatile memory a type of reproduction program having the highest number of corresponding contents.

With the above construction, the reproduction program having the highest corresponding contents number (i.e., having a high possibility of being used) is stored (cached) in the nonvolatile memory that retain data therein even when the apparatus is powered off by, for example, a sudden power failure. When the prediction proves to be right, the reproduction program need not be obtained. Accordingly, when a content is actually reproduced with the obtained reproduction program in future (i.e., the prediction proves to be right), a delay in reproducing the content is reduced by a time required for obtaining the corresponding reproduction program, compared to a case where the reproduction program is deleted due to a sudden power failure.

In the above broadcast reception apparatus, the caching means may detect activation duration for each received reproduction program, and stores preferentially into the nonvolatile memory a reproduction program having the longest activation duration.

With the above construction, the reproduction program having the longest activation duration is stored (cached) in the nonvolatile memory that retain data therein even when the apparatus is powered off by, for example, a sudden power failure. Accordingly, when a content is actually reproduced with the obtained reproduction program in future (i.e., the prediction proves to be right), a delay in reproducing the content is reduced by a time required for obtaining the corresponding reproduction program, compared to a case where the reproduction program is deleted due to a sudden power failure.

In the above broadcast reception apparatus, the determining means, when there are a plurality of candidate reproduction programs, may determine preferentially a reproduction program having the longest activation duration as the reproduction program to be cached.

With the above construction, when there are a plurality of candidate reproduction programs, a reproduction program having the longest activation duration is selected. This enables a reproduction program that has a high possibility of being used and the longest activation duration to be obtained in advance. Accordingly, when the prediction proves to be right, a delay in reproducing the content is reduced by a time required for obtaining the corresponding reproduction program (though the activation duration is longer), compared to a method in which a reproduction program is obtained together with the corresponding content.

In the above broadcast reception apparatus, the reproduction program determining means may include: an input means for receiving from a viewer a selection of reproduction programs to be cached; and a determining means for determining some of the reproduction programs selected by the viewer as reproduction programs to be cached when the some of the reproduction programs are to be transmitted during a predetermined time period after the current time.

With the above construction, the broadcast reception apparatus obtains, in advance, a reproduction program with a high possibility of being used by the viewer in future. Accordingly, when the viewer actually views a content that is reproduced with the obtained reproduction program (i.e., the prediction proves to be right), a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a contents identifying means for identifying, by referring to the broadcast information, contents that are to be transmitted during a predetermined time period after the current time, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast, prior to the broadcast. Accordingly, by setting the predetermined time period to the one during which the viewer tends to view broadcast programs, it is possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a contents identifying means for identifying, by referring to the broadcast information, contents that are to be transmitted over a channel which is currently used for transmitting a content, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast using the currently used channel, prior to the broadcast. It is highly possible that the currently used channel is kept to be used for the viewer. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a contents identifying means for identifying, by referring to the history information, contents that are to be transmitted over a channel to which a viewer subscribes, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast using a channel to which the viewer subscribes, prior to the broadcast. The viewer views only broadcast programs provided through the subscribed channel. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a contents identifying means for identifying, by referring to the broadcast information, contents that are to be transmitted over one or more channels adjacent to a channel that is currently used, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast using a channel adjacent to a currently used channel, prior to the broadcast. It is highly possible that the viewer selects the adjacent channel using an input means such as a remote control. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: an input means for receiving a selection of channels from a viewer; a contents identifying means for identifying, by referring to the broadcast information, contents that are to be transmitted over the channels specified by the viewer, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast using a channel specified by the viewer, prior to the broadcast. The viewer specifies the channel since he intends to use the channel. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a storage means for storing history information that shows history of channels having been selected; a contents identifying means for identifying, by referring to the history information, channels that have been selected a predetermined number of times or more, and identifying, by referring to the broadcast information, contents that correspond to the identified channels, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content of a broadcast program to be broadcast using a channel that has been selected by the viewer a lot of times, prior to the broadcast. It is highly possible that the channel is used also in future. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information further shows correspondence between the reproduction programs and the contents, and also shows genres to which the contents belong, the reproduction program determining means includes: a contents identifying means for identifying, by referring to the broadcast information, contents that belong to a genre to which a content currently viewed belongs, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program prior to the broadcast of the corresponding content which is to be broadcast and belongs to a genre of a currently viewed content. Accordingly, since the genre of the currently viewed content has a high possibility of being viewed in future, it is possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, and also shows genres to which the contents belong, the reproduction program determining means includes: an input means for receiving a selection of genres from a viewer; a contents identifying means for identifying, by referring to the broadcast information, contents that belong to the genres specified by the viewer, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program prior to the broadcast of the corresponding content which is to be broadcast and belongs to a genre specified by the viewer. Accordingly, since the viewer-specified genre has a high possibility of being selected in future, it is possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a contents identifying means for identifying, by referring to the broadcast information, contents to which a viewer subscribes, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content to which the viewer subscribes and which is to be broadcast, prior to the broadcast. It is highly possible that the content to which the viewer subscribe is viewed in future. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: an input means for receiving from a viewer a preselection of contents to be recorded; a contents identifying means for identifying, by referring to the broadcast information, the contents preselected by the viewer, as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program corresponding to a content which is preselected by the viewer to be recorded and is to be broadcast. The preselected content is expected to be viewed unless the preselection is canceled. It is therefore possible to effectively predict a reproduction program with a high possibility of being used in future. Accordingly, when the prediction proves to be right, a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, the reproduction program determining means includes: a storage means for storing history information that shows history of contents having been viewed; a contents identifying means for identifying, by referring to the history information, contents that have been viewed a predetermined number of times or more, and identifying contents, among the contents that have been viewed the predetermined number of times or more, shown in the broadcast information as viewing candidate contents; a reproduction program identifying means for identifying reproduction programs that correspond to the viewing candidate contents as candidate reproduction programs, by referring to the broadcast information; and a determining means for determining the reproduction program to be cached, among the candidate reproduction programs.

With the above construction, the broadcast reception apparatus obtains a reproduction program prior to the broadcast of the corresponding content which is to be broadcast and has been viewed a high number of times. Accordingly, since the content that has been viewed a high number of times has a high possibility of being viewed in future, it is possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, when the identifying means has identified a plurality of sets of a service period and a channel, the identifying means may further select a set including the earliest service period among the plurality of sets.

With the above construction, the broadcast reception apparatus obtains a reproduction program having a high possibility of being used, as soon as possible. It is therefore possible to prevent the reproduction program from being obtained after the broadcast start of the content.

In the above broadcast reception apparatus, the reproduction program storage means may include a volatile memory and a nonvolatile memory, and the caching means caches received reproduction programs to the nonvolatile memory, the broadcast reception apparatus further comprising a memory control means for storing predetermined reproduction programs stored in the nonvolatile memory into the volatile memory.

With the above construction, a reproduction program having a high possibility of being used can be stored in the volatile memory. Accordingly, a delay in reproducing the content is reduced by the time difference between the access times for the volatile and nonvolatile memories.

In the above broadcast reception apparatus, the reproduction program storage means may include a volatile memory and a nonvolatile memory, and the caching means caches received reproduction programs in the volatile memory, the broadcast reception apparatus further comprising a copying means for copying predetermined reproduction programs from the volatile memory to the nonvolatile memory.

With the above construction, the cached reproduction program is stored in the nonvolatile memory that retain data therein even when the apparatus is powered off by, for example, a sudden power failure. Accordingly, when a content is actually reproduced with the obtained reproduction program in future (i.e., the prediction proves to be right), a delay in reproducing the content is reduced by a time required for obtaining the corresponding reproduction program, compared to a method in which a reproduction program is obtained together with the corresponding content.

In the above broadcast reception apparatus, the broadcast information may further show correspondence between the reproduction programs and the contents, and the shut-down means counts, by referring to the broadcast information, the number of contents that are to be transmitted after the current time, and stores preferentially a reproduction program having the highest number of corresponding contents in the nonvolatile memory.

With the above construction, a reproduction program having the highest corresponding contents number among those stored in the reproduction program storage unit is stored in the nonvolatile memory when the broadcast reception apparatus is powered off. This is because it is assumed that the reproduction program having the highest corresponding contents number has a high possibility of being used. As a result, when the apparatus is powered on the next time, the reproduction program exists in the nonvolatile memory. When the prediction proves to be right, a delay in reproducing the content is reduced by a time required for obtaining the corresponding reproduction program, compared to a method in which a reproduction program is obtained together with the corresponding content.

In the above broadcast reception apparatus, the shut-down means may identify a reproduction program that has the longest activation duration among reproduction programs stored in the reproduction program storage means, and stores the identified reproduction program preferentially into the nonvolatile memory.

With the above construction, a reproduction program having the longest activation duration among those stored in the reproduction program storage unit is stored in the nonvolatile memory when the broadcast reception apparatus is powered off. As a result, when the apparatus is powered on the next time, the reproduction program exists in the nonvolatile memory. When the prediction proves to be right, a delay in reproducing the content is reduced by a time required for obtaining the corresponding reproduction program, compared to a method in which a reproduction program is obtained together with the corresponding content.

In the above broadcast reception apparatus, the reproduction program determining means may include: a storage means for storing hit rate information that shows a hit rate for each reproduction program the caching means has stored in the reproduction program storage means; a reproduction program identifying means for identifying reproduction programs having hit rates of a predetermined value or higher by referring to the hit rate information, and identifying as candidate reproduction programs reproduction programs, among the reproduction programs having hit rates of the predetermined value or higher, that are shown in the broadcast information; and a determining means for determining the reproduction program to be cached, among the candidate reproduction programs.

With the above construction, the broadcast reception apparatus obtains a reproduction program having a high hit rate in the past. It is highly possible that the reproduction program having a high hit rate in the past is also used in future. It is therefore possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the determining means, when there are a plurality of candidate reproduction programs, may determine preferentially a reproduction program having the highest hit rate as the reproduction program to be cached, by referring to the hit rate information.

With the above construction, when there are a plurality of candidate reproduction programs having a hit rate of a certain value or more, a reproduction program having the highest hit rate is preferentially selected. It is therefore possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the reproduction program storage means may include a volatile memory and a nonvolatile memory, and the caching means refers to the hit rate information and stores preferentially a reproduction program having the highest hit rate into the volatile memory.

With the above construction, a reproduction program having the highest hit rate is stored in the volatile memory when the reproduction program is cached. It is expected that the reproduction program having the highest hit rate has a highest possibility of being used. As a result, when the prediction proves to be right, a delay in reproducing the content is reduced by the time difference between the access times for the volatile and nonvolatile memories.

In the above broadcast reception apparatus, the reproduction program storage means may include a volatile memory and a nonvolatile memory, and the caching means refers to the hit rate information and stores preferentially a reproduction program having the highest hit rate into the nonvolatile memory.

With the above construction, a reproduction program having the highest hit rate is stored in the nonvolatile memory when the reproduction program is cached. It is expected that the reproduction program having the highest hit rate has a highest possibility of being used. The nonvolatile memory retains data even when the apparatus is powered off by, for example, a sudden power failure. Accordingly, when a content is actually reproduced with the obtained reproduction program in future (i.e., the prediction proves to be right), a delay in reproducing the content is reduced by a time required for obtaining the corresponding reproduction program, compared to a case where the reproduction program is deleted due to a sudden power failure.

In the above broadcast reception apparatus, the reproduction program storage means may include a volatile memory and a nonvolatile memory, and the caching means caches the reproduction program to either the volatile memory or the nonvolatile memory, the broadcast reception apparatus further comprising a shut-down means for, when receiving an instruction to shut down the broadcast reception apparatus, checking whether a reproduction program having the highest hit rate among reproduction programs stored in the reproduction program storage means is stored in the nonvolatile memory, and when the reproduction program having the highest hit rate is not stored, shutting down the broadcast reception apparatus after storing the reproduction program having the highest hit rate in the nonvolatile memory.

With the above construction, a reproduction program having the highest cache hit rate among those stored in the reproduction program storage unit is stored in the nonvolatile memory when the broadcast reception apparatus is powered off. As a result, when the apparatus is powered on the next time, the reproduction program exists in the nonvolatile memory. When the prediction proves to be right, a delay in reproducing the content is reduced by a time required for obtaining the corresponding reproduction program, compared to a method in which a reproduction program is obtained together with the corresponding content.

In the above broadcast reception apparatus, the reproduction program determining means may include: a storage means for storing history information that shows for each reproduction program a number of times the reproduction program was stored in the reproduction program storage means by the caching means; a reproduction program identifying means for identifying reproduction programs that have been stored a predetermined number of times or more by referring to the history information, and identifying as candidate reproduction programs reproduction programs, among the reproduction programs that have been stored the predetermined number of times or more, that are shown in the broadcast information; and a determining means for determining the reproduction program to be cached, among the candidate reproduction programs.

With the above construction, a reproduction program that has been stored the highest number of times in the past is obtained. Accordingly, when there is a probability that the viewing candidate contents are equally viewed, the higher the corresponding contents number is, the higher possibility of being used the reproduction program has. It is therefore possible to predict a reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the determining means, when there are a plurality of candidate reproduction programs, may refer to the hit rate information and determines preferentially a reproduction program that has been stored the highest number of times, as the reproduction program to be cached.

With the above construction, when there are a plurality of candidate reproduction programs that have been cached a certain number of times or more, a reproduction program having been cached the highest number of times is preferentially selected. It is therefore possible to predict effectively the reproduction program having a high possibility of being used. When the prediction proves to be right, a delay in reproducing the content is reduced by a time required for obtaining the corresponding reproduction program, compared to a method in which a reproduction program is obtained together with the corresponding content.

In the above broadcast reception apparatus, the reproduction program storage means may include a volatile memory and a nonvolatile memory, and the caching means refers to the history information and stores preferentially a reproduction program that has been stored the highest number of times, into the volatile memory.

With the above construction, a reproduction program having been cached the highest number of times is stored in the volatile memory when the reproduction program is cached. It is expected that the reproduction program having been cached the highest number of times has a highest possibility of being used. As a result, when the prediction proves to be right, a delay in reproducing the content is reduced by the time difference between the access times for the volatile and nonvolatile memories.

In the above broadcast reception apparatus, the reproduction program storage means may include a volatile memory and a nonvolatile memory, and the caching means refers to the history information and stores preferentially a reproduction program that has been stored the highest number of times, into the nonvolatile memory.

With the above construction, a reproduction program having been cached the highest number of times is stored in the nonvolatile memory when the reproduction program is cached. It is expected that the reproduction program having been cached the highest number of times has a highest possibility of being used. The nonvolatile memory retains data even when the apparatus is powered off by, for example, a sudden power failure. Accordingly, when a content is actually reproduced with the obtained reproduction program in future (i.e., the prediction proves to be right), a delay in reproducing the content is reduced by a time required for obtaining the corresponding reproduction program, compared to a case where the reproduction program is deleted due to a sudden power failure.

In the above broadcast reception apparatus, the reproduction program storage means includes a volatile memory and a nonvolatile memory, and the caching means stores received reproduction programs into the nonvolatile memory, the broadcast reception apparatus further comprising a shut-down means for, when receiving an instruction to shut down the broadcast reception apparatus, checking whether a reproduction program having the highest hit rate among reproduction programs stored in the reproduction program storage means is stored in the nonvolatile memory, and when the reproduction program having the highest hit rate is not stored, shutting down the broadcast reception apparatus after storing the reproduction program having the highest hit rate in the nonvolatile memory.

With the above construction, a reproduction program having been cached the highest number of times among those stored in the reproduction program storage unit is stored in the nonvolatile memory when the broadcast reception apparatus is powered off. As a result, when the apparatus is powered on the next time, the reproduction program exists in the nonvolatile memory. When the prediction proves to be right, a delay in reproducing the content is reduced by a time required for obtaining the corresponding reproduction program, compared to a method in which a reproduction program is obtained together with the corresponding content.

The above object is also fulfilled by a broadcasting apparatus for transmitting contents and reproduction programs that correspond to types of the contents, characterized by transmitting broadcast information which shows for each content a set of a service period and a channel during and over which the content is transmitted, and also shows for each reproduction program a set of a service period and a channel during and over which the reproduction program is transmitted.

With the above construction, the broadcasting apparatus transmits the broadcast information which shows the transmission schedule for the contents and reproduction programs. This enables the broadcast reception apparatus that receives the broadcast information to use the information to obtain reproduction programs prior to the reception of the contents. It is therefore possible for the broadcast reception apparatus to reduce a delay in reproducing the content by a time required for obtaining the corresponding reproduction program, compared to a method in which a reproduction program is obtained together with the corresponding content.

As described above, with the present invention, the viewer need not wait before viewing contents that are reproduced by execution of reproduction programs. This enables a various contents, which require a various types of reproduction programs, to be broadcast. This provides a great practical effect.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows correspondence between PIDs and reproduction programs;

FIG. 4 shows an example of the broadcast information;

FIG. 10 shows corresponding contents numbers for the reproduction programs transmitted over all the channels during the current service period and onward up to the last service period;

FIG. 11 shows the service periods and channels during and over which the reproduction program with PID 2 is transmitted;

FIG. 13 shows corresponding contents numbers for the reproduction programs transmitted over all the channels during the current service period and onward up to the last service period;

FIG. 15 shows corresponding contents numbers for the reproduction programs used for reproducing the contents for the specified channel, during the current service period and onward up to the last service period;

FIG. 16 shows an example of the broadcast information including information of genres to which the contents belong;

FIG. 17 shows relationships between JIDs and genres;

FIG. 19 shows corresponding contents numbers for the reproduction programs used for reproducing the contents belonging to the specified genres;

FIG. 20 shows the service periods and channels during and over which the reproduction program with PID 1 is transmitted;

FIG. 22 shows corresponding contents numbers for the reproduction programs used for reproducing the contents of the specified broadcast program, where the viewer specifies broadcast programs with SIDs 1, 8, 15, 20, 24, 29, and 35;

FIG. 23 shows an example of cache history information for one past week;

FIG. 28 shows an example of the reproduction program information;

FIG. 30 shows an example of the reproduction program information;

FIG. 32 shows an example of the reproduction program information;

DESCRIPTION OF THE PREFERRED EMBODIMENTS

Figure 1:
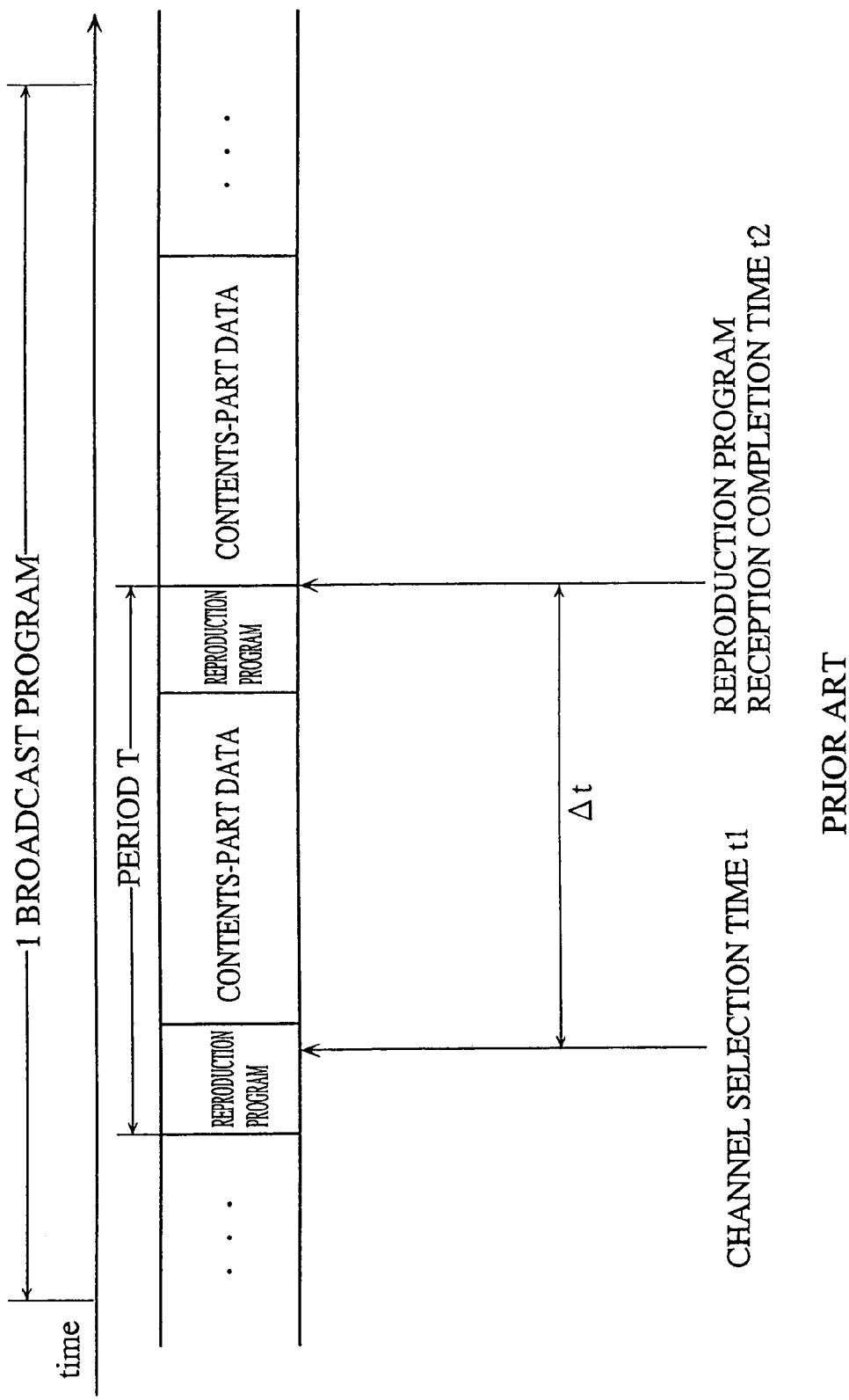
FIG. 1 shows time-division-multiplexed data transmitted by a broadcasting apparatus.

The following are description of the present invention through specific embodiments thereof by way of referring to the drawings.

<Embodiment 1>

The present embodiment relates to (a) a broadcasting apparatus that transmits broadcast information indicating the types of the reproduction programs corresponding to the contents, the times when the contents and the reproduction programs are transmitted, and the channels over which the contents and the reproduction programs are transmitted, and (b) a broadcast reception apparatus that has a function to previously read and cache high-use-possibility reproduction programs.

Construction of Broadcasting Apparatus

The broadcasting apparatus will be described first.

Figure 2:
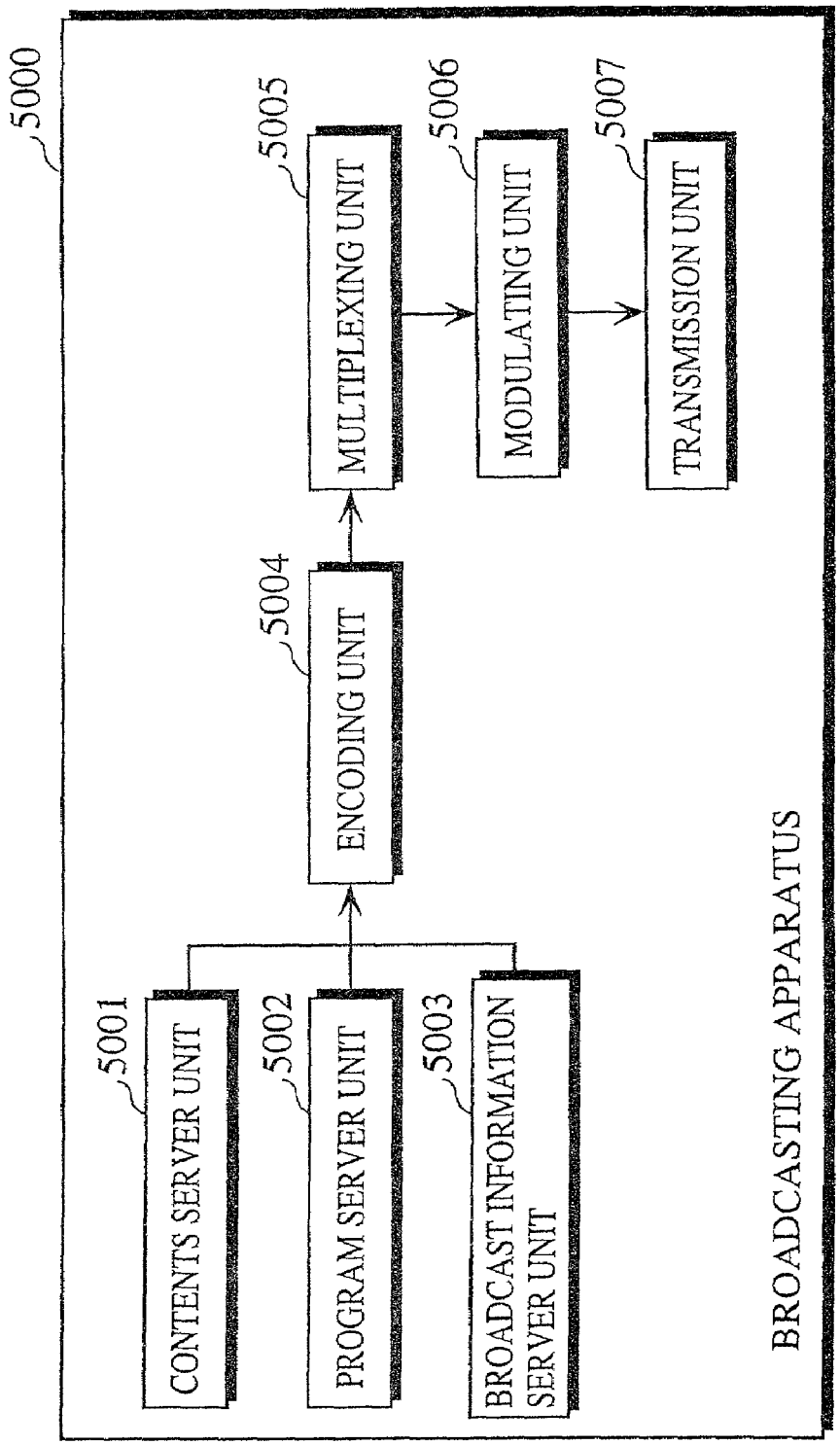
FIG. 2 is a block diagram showing the construction of the broadcasting apparatus in an embodiment of the present invention.

FIG. 2 is a block diagram showing the construction of the broadcasting apparatus in the present embodiment. As shown in FIG. 2, the broadcasting apparatus 5000 includes a contents server unit 5001, a program server unit 5002, a broadcast information server unit 5003, an encoding unit 5004, a multiplexing unit 5005, a modulating unit 5006, and a transmission unit 5007.

The contents server unit 5001 stores contents that constitute broadcast programs. It is supposed here that the contents are generated using any formats among HTML, XML, DVX, and JAVA.

Figure 3:
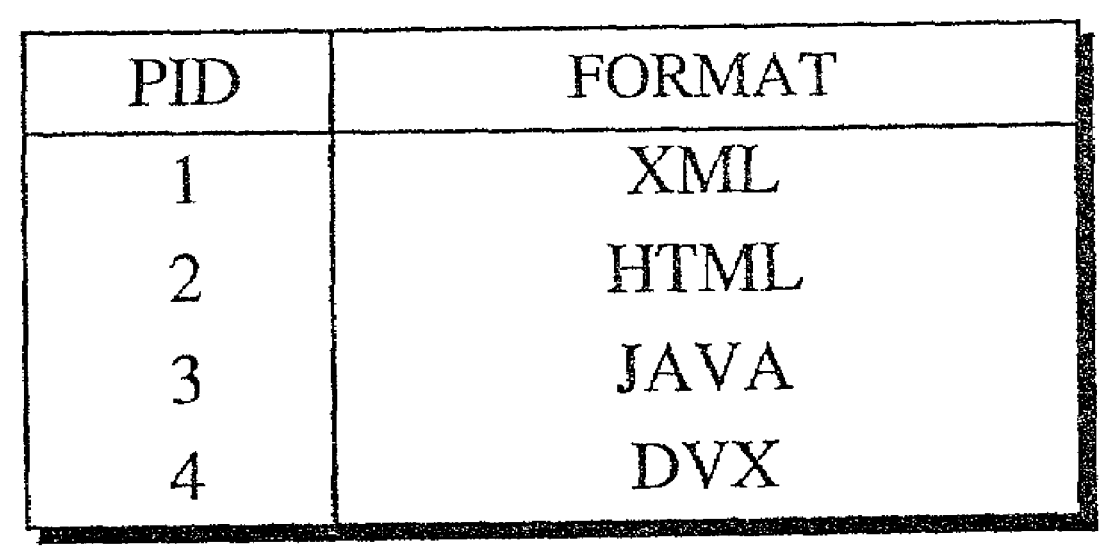

The program server unit 5002 stores reproduction programs used for reproducing the contents. The types of the reproduction programs are identified by their PIDs (program IDs). FIG. 3 shows correspondence between PIDs and reproduction programs. As shown in FIG. 3, reproduction programs of PID 1 reproduce XML-format contents, reproduction programs of PID 2 reproduce HTML-format contents, reproduction programs of PID 3 reproduce JAVA-format contents, and reproduction programs of PID 4 reproduce DVX-format contents.

The broadcast information server unit 5003 stores the broadcast information. FIG. 4 shows an example of the broadcast information. In FIG. 4, SID represents a service ID which is assigned to each broadcast program for identification thereof. A CID (contents ID), a PID (program ID), a "service period", and a "channel" are determined for each SID. The CID indicates a content of the broadcast program. The PID indicates a type of the reproduction program used for reproducing the broadcast program. The service period indicates a time period during which the broadcast program is broadcast (i.e., a time period during which the content with the CID and the reproduction program with the PID are transmitted). The "channel" indicate the channel over which the broadcast program is broadcast. FIG. 4 shows the broadcast information for one day. The broadcast information, however, may include information for shorter time period (e.g., several hours) or for longer time period (e.g., several weeks).

The encoding unit 5004 encodes the contents, reproduction programs, and broadcast information. The encoding unit 5004 uses known video and audio encoding methods for encoding video and audio data constituting the contents, and a known data encoding method for encoding graphics data that constitutes the reproduction programs, broadcast information, and contents.

Figure 5:
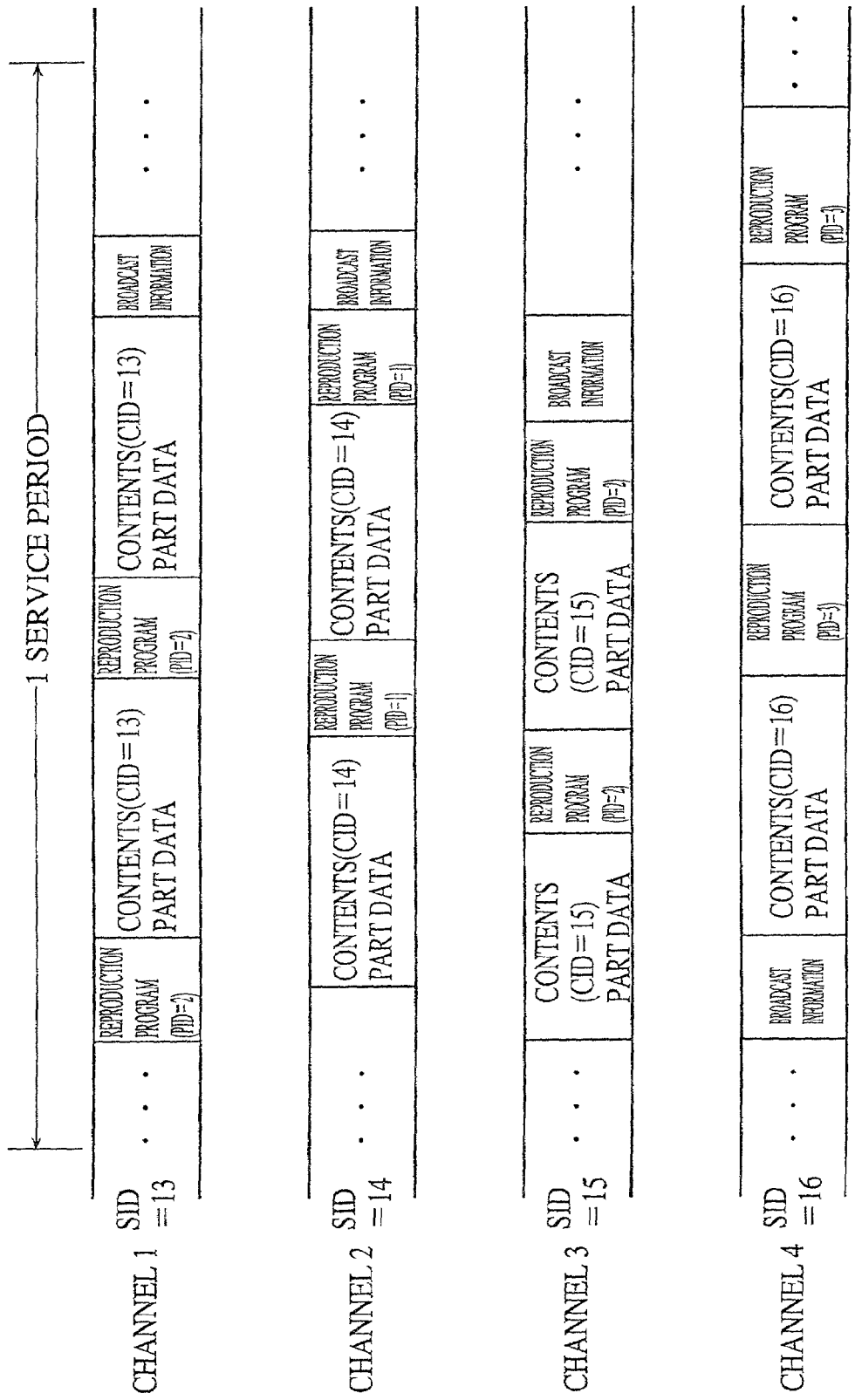
FIG. 5 shows multiplexed data transmitted during one service period.

The multiplexing unit 5005 time-division-multiplexes the encoded contents, reproduction programs, and broadcast information to generate multiplexed data. FIG. 5 shows multiplexed data transmitted during one service period. As understood from FIG. 5, each broadcast program is transmitted over one of the logical channels 1 to 4. Each channel transmits time-division-multiplexed contents, reproduction programs, and broadcast information. It should be noted here that the contents, reproduction programs, and broadcast information may be divided into smaller units called "packets". Also, the same data may be repeatedly transmitted during the service period (carousel method).

The modulating unit 5006 generates the broadcast data by modulating the multiplexed data.

The transmission unit 5007 transmits the broadcast data to the broadcast reception apparatus.

Construction of Broadcast Reception Apparatus

Figure 6:
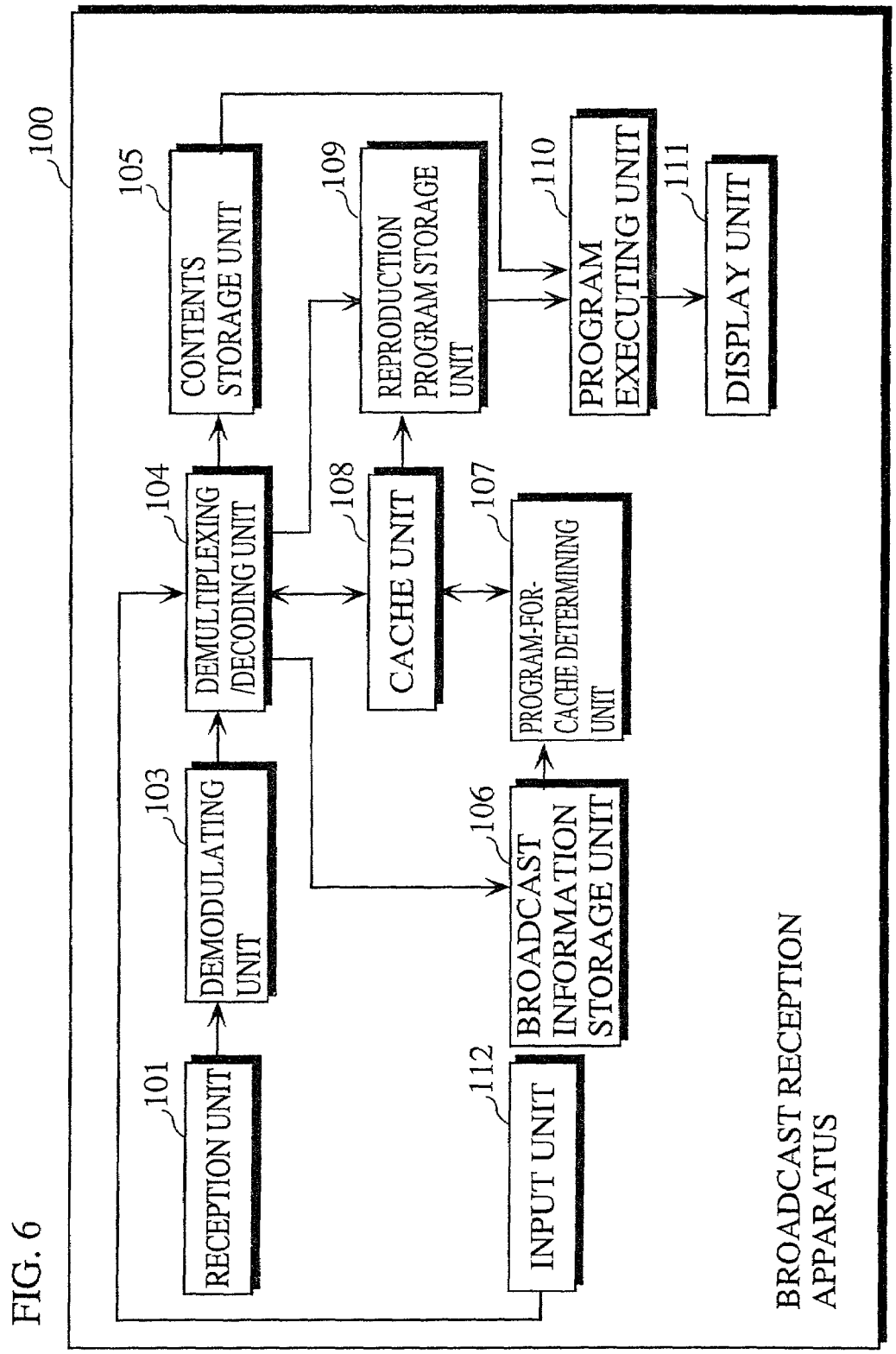
FIG. 6 is a block diagram showing the construction of the broadcast reception apparatus in an embodiment of the present invention.

FIG. 6 is a block diagram showing the construction of the broadcast reception apparatus in the present embodiment. As shown in FIG. 6, the broadcast reception apparatus includes a reception unit 101, a demodulating unit 103, a demultiplexing/decoding unit 104, a contents storage unit 105, a broadcast information storage unit 106, a program-for-cache determining unit 107, a cache unit 108, a reproduction program storage unit 109, a program executing unit 110, a display unit 111, and an input unit 112.

The input unit 112 receives selection of a channel from the viewer via a remote control.

The reception unit 101 receives the broadcast data from the broadcasting apparatus 5000.

The demodulating unit 103 demodulates the broadcast data received by the reception unit 101 to restore the multiplexed data.

The demultiplexing/decoding unit 104 extracts the data transmitted over the selected channel notified via the input unit 112, from the multiplexed data sent from the demodulating unit 103. The demultiplexing/decoding unit 104 stores contents in the contents storage unit 105, and stores broadcast information in the broadcast information storage unit 106. The demultiplexing/decoding unit 104 stores reproduction programs in the reproduction program storage unit 109 only when the reproduction programs have not been stored in the unit 109.

The demultiplexing/decoding unit 104 receives an instruction from the cache unit 108 to cach a reproduction program with a service period and a channel specified, and obtains the reproduction program and stores it in the reproduction program storage unit 109.

The contents storage unit 105 stores the contents sent from the demultiplexing/decoding unit 104.

The broadcast information storage unit 106 stores the broadcast information sent from the demultiplexing/decoding unit 104.

The program-for-cache determining unit 107 determines a reproduction program to be cached, based on the broadcast information stored in the broadcast information storage unit 106. In the present embodiment, the program-for-cache determining unit 107 counts the number of contents (hereinafter referred to as a corresponding contents number) that are to use reproduction programs, for each reproduction program transmitted over each channel during the current service period and onward up to the last service period shown in the broadcast information, and determines a reproduction program that has the highest corresponding contents number, as the one to be cached. This is because the reproduction program that has the highest corresponding contents number has the highest possibility of being used in future. The program-for-cache determining unit 107 then determines the service period and channel during and over which the determined reproduction program is to be read in advance, and notifies the determined service period and channel to the cache unit 108.

The cache unit 108, when the broadcast reception apparatus is powered on or before broadcasting starts for a day, instructs the program-for-cache determining unit 107 to determine a reproduction program to be read in advance, and to determine the service period and channel during and over which the determined reproduction program is to be read in advance. After being notified from the program-for-cache determining unit 107 of the service period and channel during and over which the determined reproduction program is to be read in advance, the cache unit 108 sends an instruction to the demultiplexing/decoding unit 104 to cach a reproduction program, specifying a service period and a channel so that when the specified service period is reached, the demultiplexing/decoding unit 104 can demultiplex and decode the reproduction program corresponding to the channel and store it in the reproduction program storage unit 109.

The reproduction program storage unit 109 stores the reproduction program sent from the demultiplexing/decoding unit 104, the reproduction program being used for the currently viewed broadcast program. The reproduction program storage unit 109 also stores the reproduction program which is cached and sent from the demultiplexing/decoding unit 104 according to the instruction by the cache unit 108 to read in advance.

The program executing unit 110 reads a reproduction program and a content from the reproduction program storage unit 109 and the contents storage unit 105, and allows the display unit 111 to display the content according to the reproduction program.

The display unit 111, a TV screen, displays the content specified by the program executing unit 110.

Operation of Broadcast Reception Apparatus

The operation of the broadcast reception apparatus in the present embodiment will be described.

Figure 7:
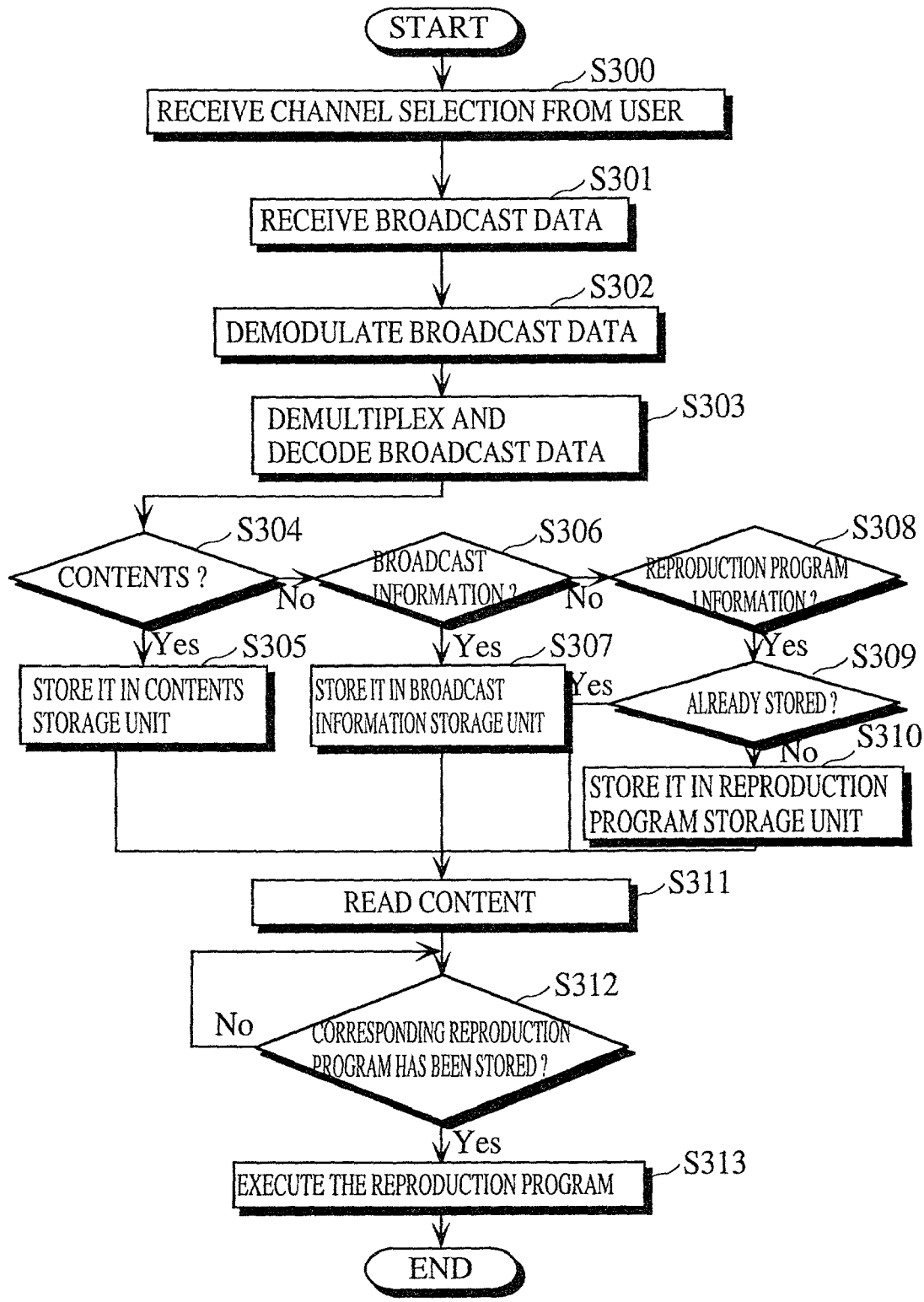
FIG. 7 is a flowchart showing the operation procedure of the entire broadcast reception apparatus an embodiment of the present invention.

FIG. 7 is a flowchart showing the operation procedure of the entire broadcast reception apparatus in the present embodiment.

The broadcast reception apparatus receives selection of a channel from the viewer via the input unit 112 (step S300).

The reception unit 101 receives broadcast data from the broadcasting apparatus 5000 (step S301).

The demodulating unit 103 demodulates the received broadcast data (step S302).

The demultiplexing/decoding unit 104 demultiplexes and decodes the data belonging to the currently selected channel, among the demodulated broadcast data (step S303).

When the demultiplexed/decoded data is a content, the demultiplexing/decoding unit 104 stores it in the contents storage unit 105 (steps S304 and S305).

When the demultiplexed/decoded data is broadcast information, the demultiplexing/decoding unit 104 stores it in the broadcast information storage unit 106 (steps S306 and S307).

When the demultiplexed/decoded data is a reproduction program, the demultiplexing/decoding unit 104 refers to the broadcast information stored in the broadcast information storage unit 106 to identify the type of the reproduction program, and only when the reproduction program has not been stored in the reproduction program storage unit 109, decodes it and stores the decoded reproduction program in the reproduction program storage unit 109 (steps S308 and S310).

The program executing unit 110 reads the content from the contents storage unit 105 (step S311).

The program executing unit 110 checks to see if the reproduction program to be used for reproducing the content has been stored in the reproduction program storage unit 109 (step S312). When the reproduction program has been stored, the program executing unit 110 reads it from the storage unit 109 and executes it (step S313). When the reproduction program has not been stored, the program executing unit 110 waits for the program to be stored in the storage unit 109. That is to say, the reproduction program is executed when it is stored in step S310, or when it is stored in accordance with the instruction from the cache unit 108, which will be described later.

Cache Operation

Now, the cache operation of the cache unit 108 will be described.

Figure 8:
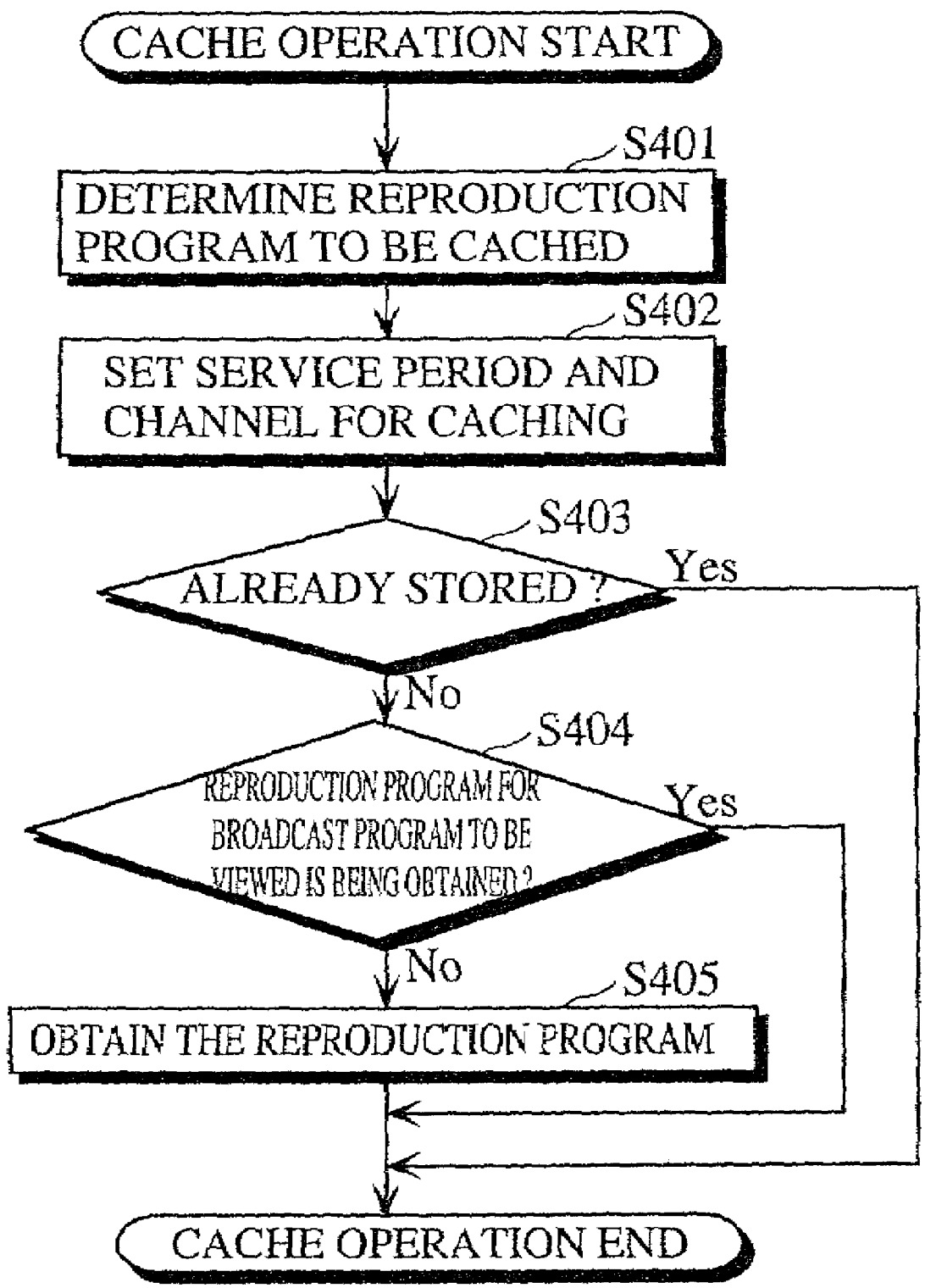
FIG. 8 is a flowchart showing the procedure of the cache operation of the cache unit 108.

FIG. 8 is a flowchart showing the procedure of the cache operation of the cache unit 108.

The cache unit 108, when the broadcast reception apparatus is powered on or before broadcasting starts for a day, instructs the program-for-cache determining unit 107 to determine a reproduction program to be cached, and to determine the service period and channel for the caching (step S401).

The cache unit 108 sets the service period and channel during and over which the reproduction program notified from the program-for-cache determining unit 107 is to be cached (step S402).

The cache unit 108 does not cache the reproduction program when the reproduction program has been stored in the reproduction program storage unit 109. Also, the cache unit 108 does not cache the reproduction program if the reproduction program has been obtained together with the content after it was confirmed that the reproduction program for the broadcast program to be viewed had not been stored in the reproduction program storage unit 109 (the case in step S310 shown in FIG. 7). When the reproduction program to be cached has not been stored and the start of the service period is reached, the cache unit 108 instructs the demultiplexing/decoding unit 104 to obtain the reproduction program corresponding to the channel. Upon receipt of this instruction, the demultiplexing/decoding unit 104 demultiplexes and decodes the reproduction program and stores it in the reproduction program storage unit 109 (steps S403, S404, S405).

Determining Reproduction Program to be Cached

The operation for determining a reproduction program to be cached will be described in detail.

Figure 9:
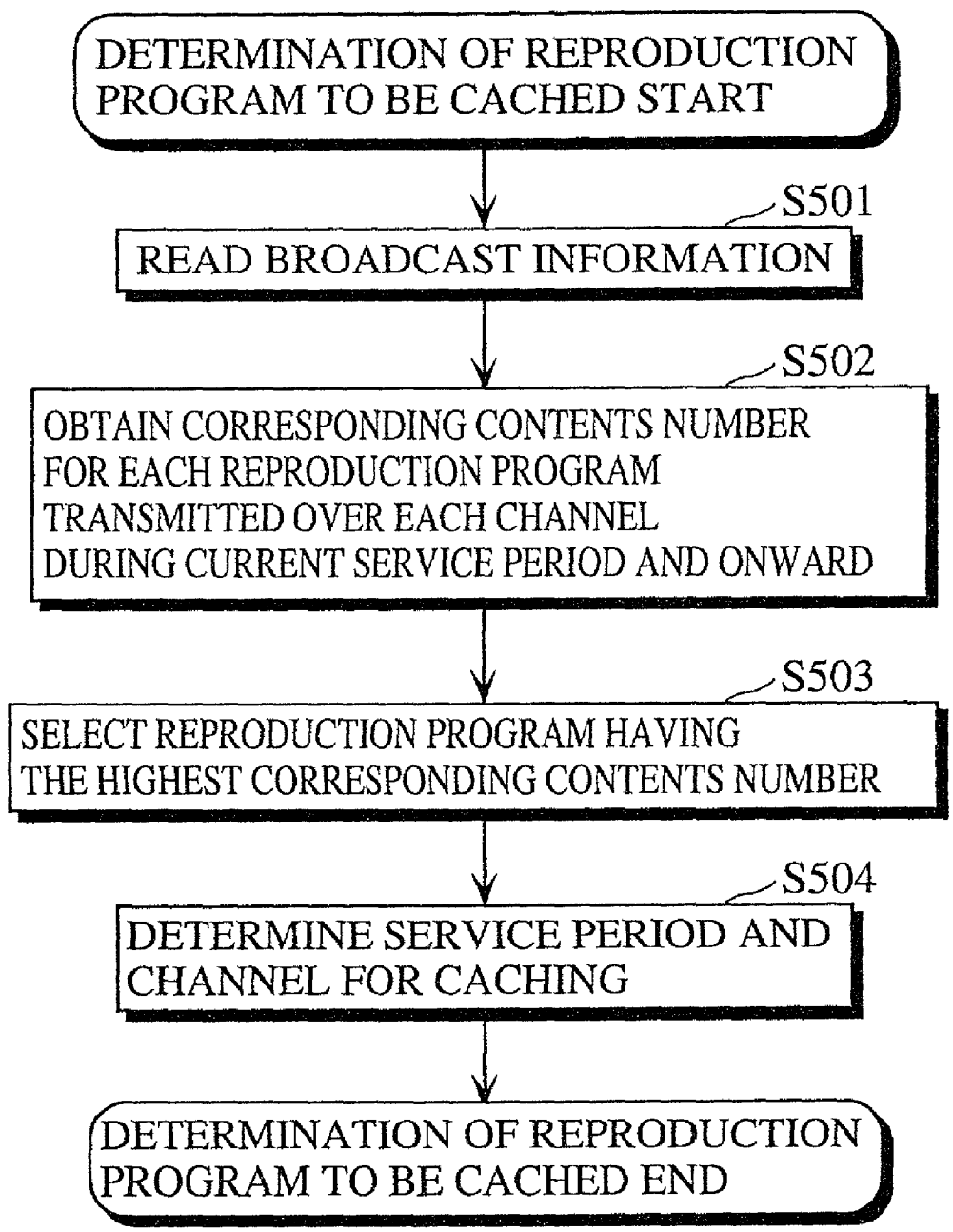
FIG. 9 is a flowchart showing the procedure of the operation for determining a reproduction program to be cached.

FIG. 9 is a flowchart showing the procedure of the operation for determining a reproduction program to be cached.

The program-for-cache determining unit 107 reads the broadcast information from the broadcast information storage unit 106 (step S501).

The program-for-cache determining unit 107 then obtains a corresponding contents number based on the broadcast information shown in FIG. 4, for each reproduction program transmitted over each channel during the current service period and onward up to the last service period shown in the broadcast information. It is supposed here that the current service period is 5:00–7:00. FIG. 10 shows corresponding contents numbers for the reproduction programs transmitted over all the channels during the current service period and onward up to the last service period (step S502).

The program-for-cache determining unit 107 determines a reproduction program that has the highest corresponding contents number, as the one to be cached. In this example, the program-for-cache determining unit 107 determines an HTML-compatible reproduction program with PID 2 as the reproduction program to be cached (step S503).

The program-for-cache determining unit 107 then refers to the broadcast information shown in FIG. 4 and determines the service period and channel during and over which the reproduction program with PID 2 is to be cached. FIG. 11 shows the service periods and channels during and over which the reproduction program with PID 2 is transmitted. In the present embodiment, the program-for-cache determining unit 107 determines the earliest service period among those shown in FIG. 11 as the one during which the reproduction program is to be cached (when there are a plurality of the earliest service periods, any one among them is selected). In this example, the program-for-cache determining unit 107 determines the current service period 5:00–7:00 as the one since in this service period, the reproduction program with PID 2 is transmitted over channel 2 (step S504).

Brief Account

As described above, in the broadcasting apparatus and the broadcast reception apparatus of the present embodiment, the program-for-cache determining unit 107 obtains, based on the broadcast information sent from the broadcasting apparatus, a corresponding contents number for each reproduction program transmitted over each channel during the current service period and onward up to the last service period shown in the broadcast information, and determines a reproduction program that has the highest corresponding contents number, as the one to be cached. With this construction, it is possible to store the reproduction program with the highest possibility of being used, in the reproduction program storage unit 109 in advance when there is a probability that the broadcast programs are equally selected during the current service period and onward. This reduces the probability that a viewer waits some time before the contents are reproduced.

Up to now, Embodiment 1 of the present invention including a broadcasting apparatus and a broadcast reception apparatus has been explained. However, the present invention is not limited to Embodiment 1. That is to say, the following variations are also included in the present invention.

(1) Time Period Used For Determining a Reproduction Program to be Cached

In the present embodiment, a reproduction program that has the highest corresponding contents number is selected as the one to be cached, among reproduction programs for broadcast programs transmitted during the current service period and onward up to the last service period of the day. However, the reproduction program to be cached may be selected among reproduction programs for broadcast programs transmitted during several weeks or during several hours starting with the current service period.

(2) Determining a Reproduction Program to be Cached

In the present embodiment, a reproduction program that has the highest corresponding contents number is selected as the one to be cached. However, a plurality of reproduction programs may be stored in the reproduction program storage unit 109 in descending order of the corresponding contents number in so far as the capacity of the storage unit 109 allows.

Alternatively, a reproduction program to be cached may be determined in accordance with duration of activation of the reproduction program, instead of the corresponding contents number. More specifically, only a reproduction program which is to be activated for the longest time period may be determined as the one to be cached, or a plurality of reproduction programs may be stored in the reproduction program storage unit 109 in descending order of the activation duration in so far as the capacity of the storage unit 109 allows. With this construction, a reproduction program which is to be activated for a long period is obtained in advance. This reduces the time required for obtaining the reproduction program when the reproduction program is executed, reducing the time waited by a viewer before the contents are reproduced.

(3) Direct Specification of Program to be Cached

In the present embodiment, first a content is specified, then a reproduction program corresponding to the specified content. However, the reproduction program to be cached may be directly specified by the viewer, regardless of the contents.

(4) Changing Reproduction Program to be Cached

In the present embodiment, whether a reproduction program has been stored is checked when the cache unit 108 caches. However, the program-for-cache determining unit 107 may check to see if a reproduction program with the highest corresponding contents number has been stored in the reproduction program storage unit 109 to determine a reproduction program to be cached, and if the reproduction program has been stored, it selects a reproduction program with the second-highest corresponding contents number.

(5) Cache

In the present embodiment, a reproduction program to be cached is stored in the reproduction program storage unit 109 even if no space is available in the storage unit 109. In this case, the new reproduction program overwrites the old reproduction program that has been stored in the storage unit 109. However, a reproduction program may be cached only when the reproduction program storage unit 109 has a certain amount of unallocated space or more. Alternatively, a reproduction program may be deleted from the reproduction program storage unit 109 after it is executed, or may be deleted after a certain time elapses, or may remain even after execution until it is overwritten by another reproduction program.

(6) Activating Reproduction Program

In the present embodiment, whether a cached reproduction program is stored in the reproduction program storage unit 109. However, the cached program may further be activated immediately before a content corresponding to the reproduction program is broadcast.

(7) Viewable Channel

In the present embodiment, four channels that can be received by one tuner, i.e., four channels that can be logically assigned to the same frequency are used. However, a plurality of tuners may be used so that broadcasts can be received over a plurality of channels assigned to a plurality of frequencies. In this case, the broadcast information includes information on the broadcasts transferred over the plurality of channels.

(8) Reproduction Program Corresponding to Contents

The reproduction programs used in the present embodiment correspond to the formats of the contents. However, any general-purpose reproduction programs corresponding to the contents may be used. For example, when a content is compressed by one of a variety of compression methods and transmitted, the reproduction program corresponding to the content may be a decompression program for the content.

(9) Multiplexing Transmission Data

In the present embodiment, the contents and the reproduction programs for the contents are multiplexed for the same channel and for the same service period before they are transmitted. Transmission of the contents and the reproduction programs is not limited to the above method. For example, a channel dedicated for transmission of reproduction programs may be additionally provided so that a plurality of reproduction programs can be transmitted repeatedly and periodically over the dedicated channel. In this case, the broadcast information shows correspondence between transmission times and channels in terms of the contents, and correspondence between transmission times and reproduction programs, and further correspondence between the contents and the reproduction programs. In this case, the program-for-cache determining unit 107 can determine only the time (need not determine a channel) when the reproduction program should be obtained, based on the broadcast information, as in the present embodiment. Also in this case, even if the reproduction program is not obtained in the earliest time, the reproduction program can be obtained immediately before the first content that has a possibility of being used is transmitted.

<Embodiment 2>

The present embodiment relates to a broadcast reception apparatus that caches a reproduction program corresponding to a content that is transmitted during the current service period and corresponds to the content that is to be broadcast in the next service period.

Construction

The broadcast reception apparatus in Embodiment 2 has the same construction as Embodiment 1 except for the program-for-cache determining unit 107 and the cache unit 108.

The program-for-cache determining unit 107 determines a reproduction program to be cached, based on the broadcast information stored in the broadcast information storage unit 106. The present embodiment is characterized in that a corresponding contents number is obtained for each reproduction program transmitted over each channel during the next service period, and determines a reproduction program that has the highest corresponding contents number, as the one to be cached.

The program-for-cache determining unit 107 then refers to the broadcast information to see if the determined reproduction program is transmitted in the current service period. When it is confirmed that the reproduction program is transmitted in the current service period, the program-for-cache determining unit 107 notifies the cache unit 108 of the current service period and the channel over which it is transmitted. When it is confirmed that the reproduction program is not transmitted in the current service period, the program-for-cache determining unit 107 determines a reproduction program that has the second-highest corresponding contents number, as the one to be cached, and repeats the above judgement and process.

The cache unit 108 instructs the program-for-cache determining unit 107 to determine, every service period (i.e., every two hours in the case of the broadcasting indicated in the broadcast information shown in FIG. 4), a reproduction program to be cached. After being notified from the program-for-cache determining unit 107 of the service period and channel during and over which the determined reproduction program is to be read in advance, and the start of the service period is reached, the cache unit 108 instructs the demultiplexing/decoding unit 104 to demultiplex and decode the reproduction program corresponding to the channel, and to send the reproduction program to the reproduction program storage unit 109.

Determining Reproduction Program to be Cached

Figure 12:
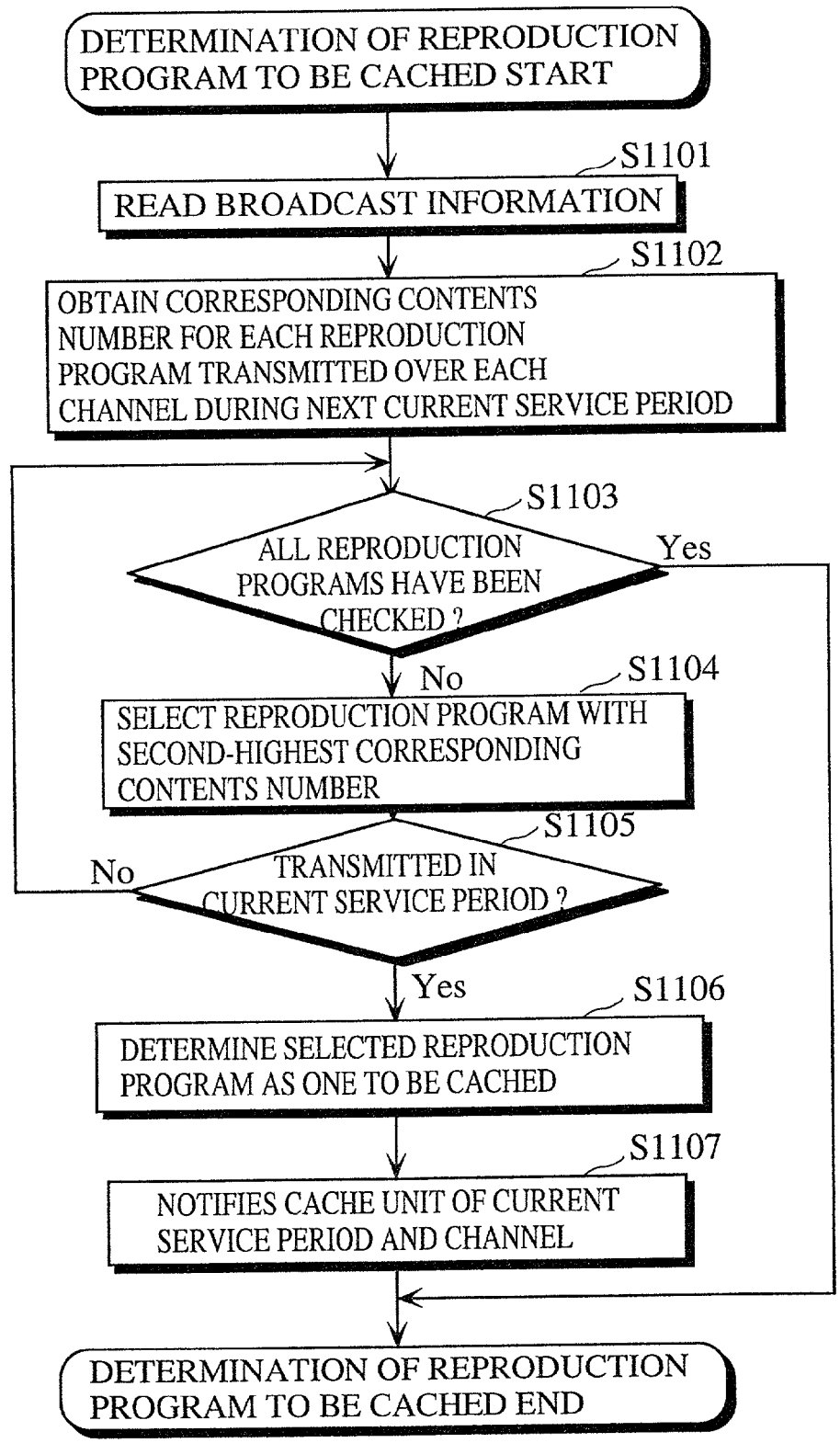
FIG. 12 is a flowchart showing the procedure of the operation for determining a reproduction program to be cached.

FIG. 12 is a flowchart showing the procedure of the operation for determining a reproduction program to be cached.

The program-for-cache determining unit 107 reads the broadcast information shown in FIG. 4 from the broadcast information storage unit 106 (step S1101).

The program-for-cache determining unit 107 then obtains a corresponding contents number based on the broadcast information shown in FIG. 4, for each reproduction program transmitted over each channel during the next service period. FIG. 13 shows corresponding contents numbers for the reproduction programs transmitted over all the channels during the current service period and onward up to the last service period. It is assumed here that the current service period is 9:00–11:00. It is understood from FIG. 13 that a reproduction program with PID 1, two reproduction programs with PID 2, and a reproduction program with PID 3 are transmitted during the next service period 11:00–13:00 (step S1102).

The program-for-cache determining unit 107 then refers to the broadcast information shown in FIG. 4 to see if an HTML-compatible reproduction program with PID 2 that has the highest corresponding contents number is transmitted in the current service period 9:00–11:00. When it is confirmed that the reproduction program is transmitted in the current service period, control returns to step S1103 so that a reproduction program with the second-highest corresponding contents number is selected. When all the reproduction programs to be transmitted in the next service period are not transmitted in the current service period, the process for determining a reproduction program to be cached ends, judging that there is no reproduction program to be cached. In this example, control moves to the next step since the reproduction program with PID 2 is transmitted over channel 3 during the current service period 9:00–11:00 (steps S1103–S1105).

When the selected reproduction program is transmitted in the current service period, the program-for-cache determining unit 107 determines the selected reproduction program with PID 2 as the reproduction program to be cached (step S106).

The program-for-cache determining unit 107 then notifies the cache unit 108 of the current service period 9:00–11:00 and channel 3 during and over which the reproduction program with PID 2 is to be cached (step S1107).

Brief Account

As described above, in the broadcast reception apparatus of the present embodiment, the program-for-cache determining unit 107 obtains a corresponding contents number for each reproduction program transmitted over each channel during the next service period and determines a reproduction program that has the highest corresponding contents number, as the one to be cached. With this construction, it is possible to store the reproduction program with the highest possibility of being used, in the reproduction program storage unit 109 in advance when there is a probability that the broadcast programs are equally selected during the next service period. This reduces the probability that a viewer waits some time before the contents are reproduced.

Up to now, Embodiment 2 of the present invention has been explained. However, the present invention is not limited to Embodiment 2. That is to say, the following variations are also included in the present invention.

(1) Determining a Reproduction Program to be Cached

In the present embodiment, a reproduction program that has the highest corresponding contents number is selected as the one to be cached. However, as is the case with Embodiment 1, a plurality of reproduction programs may be stored in the reproduction program storage unit 109 in descending order of the corresponding contents number in so far as the capacity of the storage unit 109 allows.

Alternatively, when the reproduction program storage unit 109 has enough capacity, all the reproduction programs that are to be transmitted during the next service period and are also being transmitted in the current service period may be cached.

Also, a reproduction program to be cached may be determined in accordance with duration of activation of the reproduction program, instead of the corresponding contents number. More specifically, only a reproduction program which is to be activated for the longest time period may be determined as the one to be cached, or a plurality of reproduction programs may be stored in the reproduction program storage unit 109 in descending order of the activation duration in so far as the capacity of the storage unit 109 allows.

(2) Service Periods Used For Determining a Reproduction Program to be Cached

In the present embodiment, a reproduction program to be cached is selected among those transmitted during the next service period. However, other service periods may be used for determining a reproduction program to be cached. The reproduction program may be selected among those transmitted during the current service period, for example. In this case, in preparation for a channel switching by the viewer, the reproduction program for the content corresponding to the expected channel may be obtained in advance.

<Embodiment 3>

The present embodiment relates to a broadcast reception apparatus that caches a reproduction program corresponding to a content that is transmitted over a specified channel.

Construction

The broadcast reception apparatus in Embodiment 3 has the same construction as Embodiment 1 except for the program-for-cache determining unit 107.

The program-for-cache determining unit 107 refers to the broadcast information stored in the broadcast information storage unit 106 to count the corresponding contents number for each reproduction program transmitted over a specified channel during the current service period and onward up to the last service period shown in the broadcast information, and determines a reproduction program that has the highest corresponding contents number, as the one to be cached, then determines the service period and channel during and over which the determined reproduction program is to be cached, and notifies the determined service period and channel to the cache unit 108.

Operation

Figure 14:
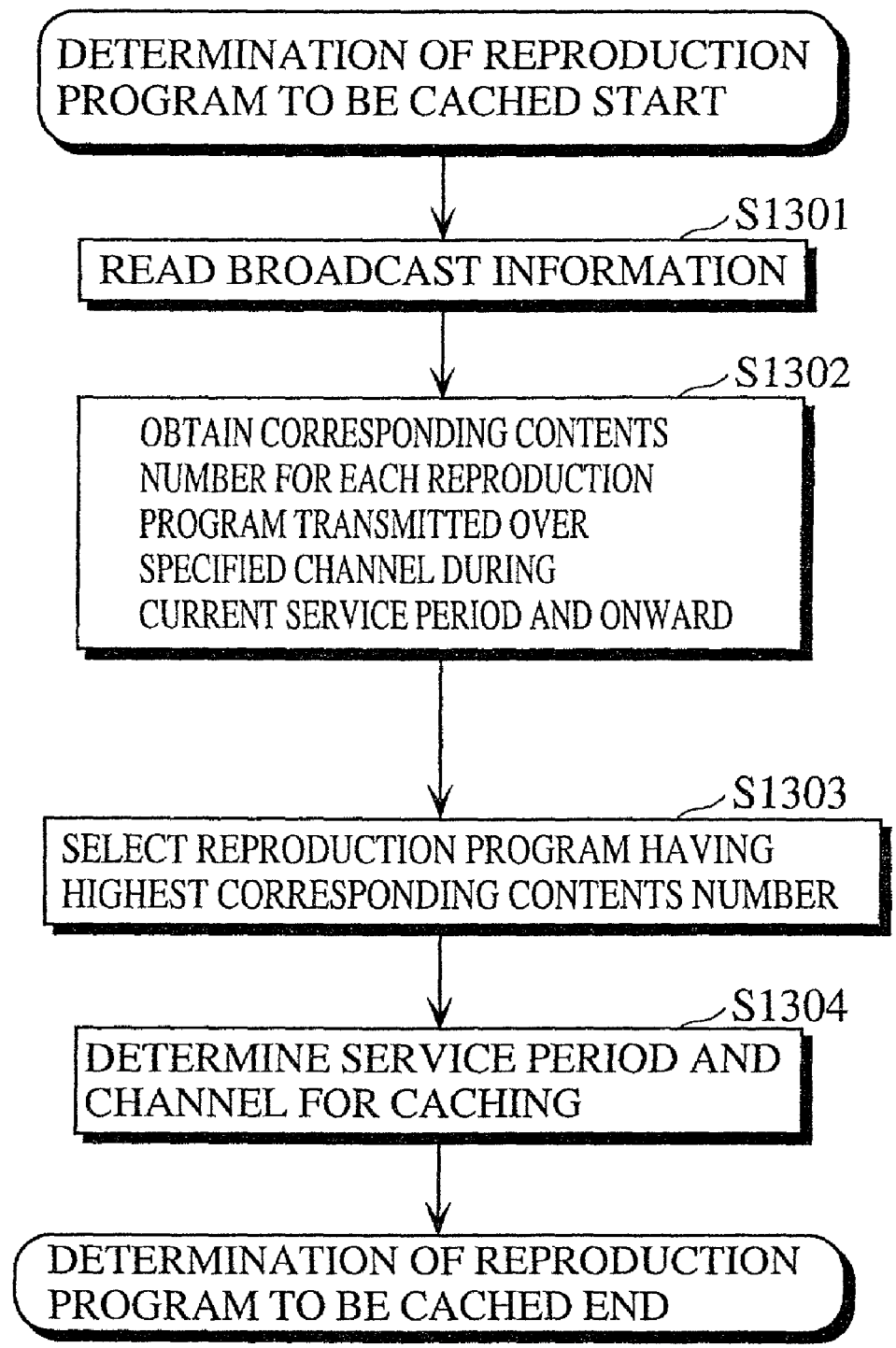
FIG. 14 is a flowchart showing the procedure of the operation for determining a reproduction program to be cached.

FIG. 14 is a flowchart showing the procedure of the operation for determining a reproduction program to be cached.

The program-for-cache determining unit 107 reads the broadcast information shown in FIG. 4 from the broadcast information storage unit 106 (step S1301).

The program-for-cache determining unit 107 then obtains a corresponding contents number based on the broadcast information shown in FIG. 4, for each reproduction program used for reproducing the contents for a specified channel during the current service period and onward up to the last service period.

FIG. 15 shows corresponding contents numbers for the reproduction programs used for reproducing the contents for channel 2, the specified channel, during the current service period 5:00–7:00 and onward up to the last service period (step S1302).

The program-for-cache determining unit 107 determines an HTML-compatible reproduction program with PID 2 that has the highest corresponding contents number, as the one to be cached (step S1303).

The program-for-cache determining unit 107 then refers to the broadcast information shown in FIG. 4 to determine the service period and channel during and over which the reproduction program with PID 2 is to be cached. FIG. 11 shows the service periods and channels during and over which the reproduction program with PID 2 is transmitted. In the present embodiment, the program-for-cache determining unit 107 determines the earliest service period among those shown in FIG. 11 as the one during which the reproduction program is to be cached. In this example, the program-for-cache determining unit 107 determines the current service period 5:00–7:00 as the one since in this service period, the reproduction program with PID 2 is transmitted (step S1304).

Brief Account

As described above, in the broadcast reception apparatus of the present embodiment, the program-for-cache determining unit 107 obtains a corresponding contents number for each reproduction program transmitted over a user-specified channel during the current service period and onward up to the last service period shown in the broadcast information, and determines a reproduction program that has the highest corresponding contents number, as the one to be cached. With this construction, it is possible to store the reproduction program with the highest possibility of being used, in the reproduction program storage unit 109 in advance when the viewer views broadcast programs through the channel the viewer has specified This reduces the probability that a viewer waits some time before the contents are reproduced.

Up to now, Embodiment 3 of the present invention has been explained. However, the present invention is not limited to Embodiment 3. That is to say, the following variations are also included in the present invention.

(1) Channel Used For Determining a Reproduction Program to be Cached

In the present embodiment, a reproduction program to be cached is selected among those transmitted over a user-specified channel. However, the reproduction program to be cached may be selected among those transmitted over the following channels.

(a) Subscribed Channel

The reproduction program to be cached is selected among those transmitted over a channel to which the viewer subscribes with the broadcasting station.

(b) Currently Viewed Channel

When the viewer currently views, for example, channel 2, a reproduction program to be cached is selected among those transmitted over channel 2 since it is highly possible that the viewer continues to view broadcast programs through the same channel.

(c) Channel Around Currently Viewed Channel

When the viewer currently views, for example, channel 2, a reproduction program to be cached is selected among those transmitted over channel 1 or 3 since it is highly possible that the viewer switches to the adjacent channels using the input unit 112, a remote control.

(d) Channel Having Been Selected Highest Number of Times

The broadcast reception apparatus may be provided with a storage means storing information indicating the history of selection of channel by the viewer. A reproduction program to be cached is then selected among those used for reproducing contents transmitted over a channel that has been selected the highest number of times by the viewer.

(2) Time Period Used For Determining a Reproduction Program to be Cached

In the present embodiment, a reproduction program that has the highest corresponding contents number is selected as the one to be cached, among reproduction programs for broadcast programs transmitted over a specified channel during the current service period and onward up to the last service period of the day. However, as is the case with a variation of Embodiment 1, the reproduction program to be cached the highest corresponding contents number may be selected among reproduction programs for broadcast programs transmitted during several days or during several hours starting with the current service period.

(3) Determining a Reproduction Program to be Cached

In the present embodiment, a reproduction program that has the highest corresponding contents number is selected as the one to be cached. However, as is the case with a variation of Embodiment 1, a plurality of reproduction programs may be stored in the reproduction program storage unit 109 in descending order of the corresponding contents number in so far as the capacity of the storage unit 109 allows.

Alternatively, a reproduction program to be cached may be determined in accordance with duration of activation of the reproduction program, instead of the corresponding contents number. More specifically, only a reproduction program which is to be activated for the longest time period may be determined as the one to be cached, or a plurality of reproduction programs may be stored in the reproduction program storage unit 109 in descending order of the activation duration in so far as the capacity of the storage unit 109 allows.

(4) Obtaining Reproduction Program for Broadcast Programs Transmitted During Specified Service Periods As is the case with Embodiment 2 as a variation of Embodiment 1, a reproduction program to be cached may be selected among those for the contents transmitted over a specified channel during the next or current service period.

<Embodiment 4>

The present embodiment relates to a broadcast reception apparatus that caches a reproduction program corresponding to a content belonging to a specified genre.

Construction

The broadcast reception apparatus in Embodiment 4 has the same construction as Embodiment 1 except for the broadcast information stored in the broadcast information storage unit 106 and the function of the program-for-cache determining unit 107.

The broadcast information storage unit 106 stores the broadcast information which include information of genres to which the contents belong. FIG. 16 shows an example of the broadcast information including information of genres to which the contents belong. As shown in FIG. 16, JID (genre ID) is assigned to each broadcast program. FIG. 17 shows relationships between JIDs and genres.

The program-for-cache determining unit 107 refers to the broadcast information stored in the broadcast information storage unit 106 to count the corresponding contents number for each reproduction program that belongs to a specified genre and is transmitted during the current service period and onward up to the last service period shown in the broadcast information, and determines a reproduction program that has the highest corresponding contents number, as the one to be cached, then determines the service period and channel during and over which the determined reproduction program is to be cached, and notifies the determined service period and channel to the cache unit 108.

Operation

Figure 18:
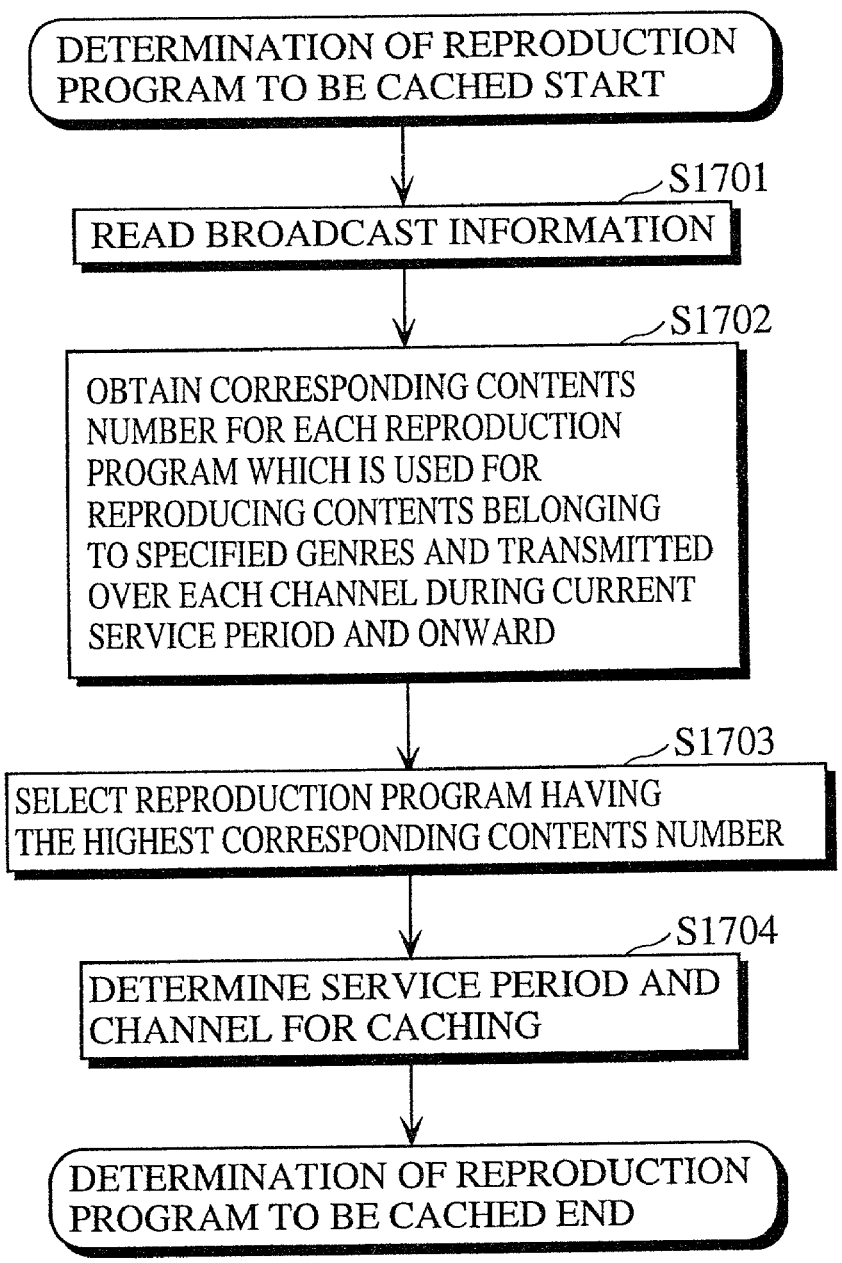
FIG. 18 is a flowchart showing the procedure of the operation for determining a reproduction program to be cached.

FIG. 18 is a flowchart showing the procedure of the operation for determining a reproduction program to be cached.

The program-for-cache determining unit 107 reads the broadcast information shown in FIG. 16 from the broadcast information storage unit 106 (step S1701).

The program-for-cache determining unit 107 then obtains a corresponding contents number based on the broadcast information shown in FIG. 16, for each reproduction program used for reproducing the contents belonging to a specified genre during the current service period and onward up to the last service period. In this example, it is supposed that the current service period is 5:00–7:00 and that genres 2 (weather report) and 3 (education program) are specified by the viewer. FIG. 19 shows corresponding contents numbers for the reproduction programs used for reproducing the contents belonging to the specified genres (step S1702).

The program-for-cache determining unit 107 determines an XML-compatible reproduction program with PID 1 that has the highest corresponding contents number as shown in FIG. 19, as the one to be cached (step S1703).

The program-for-cache determining unit 107 then refers to the broadcast information shown in FIG. 17 to determine the service period and channel during and over which the reproduction program with PID 1 is to be cached. FIG. 20 shows the service periods and channels during and over which the reproduction program with PID 1 is transmitted. In the present embodiment, the program-for-cache determining unit 107 determines the earliest service period among those shown in FIG. 17 as the one during which the reproduction program is to be cached (when there are a plurality of channels satisfying the condition, any one among them is selected). In this example, the program-for-cache determining unit 107 selects the current service period 5:00–7:00 and channel 1 since the reproduction program with PID 1 is transmitted over channel 1 during the service period 5:00–7:00 (step S1704).

Brief Account

As described above, in the broadcast reception apparatus of the present embodiment, the program-for-cache determining unit 107 obtains a corresponding contents number for each reproduction program that belongs to a specified genre and is transmitted during the current service period and onward up to the last service period shown in the broadcast information, and determines a reproduction program that has the highest corresponding contents number, as the one to be cached. With this construction, it is possible to store the reproduction program with the highest possibility of being used, in the reproduction program storage unit 109 in advance when the viewer views broadcast programs belonging to the genre the viewer specifies. This reduces the probability that a viewer waits some time before the contents are reproduced.

Up to now, Embodiment 4 of the present invention has been explained. However, the present invention is not limited to Embodiment 4. That is to say, the following variations are also included in the present invention.

(1) Genre Used for Determining a Reproduction Program to be Cached

In the present embodiment, a reproduction program to be cached is selected among those for reproducing the contents that belong to the genre specified by the viewer. However, a reproduction program to be cached may be selected among those for reproducing the contents that belong to the following genres.

(a) Genre to which Currently Viewed Content Belongs

When the viewer currently views, for example, a content belonging to genre "quiz program", a reproduction program to be cached is selected among those for reproducing the contents that belong to the genre "quiz program".

(b) Genre Having Been Selected Highest Number of Times

The broadcast reception apparatus may be provided with a storage means that stores information showing genres of the contents having been viewed by the viewer. A reproduction program to be cached is then selected among those used for reproducing contents belonging to a genre that has been selected the highest number of times by the viewer.

(2) Time Period Used for Determining a Reproduction Program to be Cached

In the present embodiment, a reproduction program that has the highest corresponding contents number is selected as the one to be cached, among reproduction programs for broadcast programs transmitted over a specified channel during the current service period and onward up to the last service period of the day. However, as is the case with a variation of Embodiment 1, the reproduction program to be cached may be the one having the highest corresponding contents number, among reproduction programs for broadcast programs transmitted during several days or during several hours starting with the current service period.

(3) Determining a Reproduction Program to be Cached

In the present embodiment, a reproduction program that has the highest corresponding contents number is selected as the one to be cached. However, as is the case with a variation of Embodiment 1, a plurality of reproduction programs may be stored in the reproduction program storage unit 109 in descending order of the corresponding contents number in so far as the capacity of the storage unit 109 allows.

Alternatively, a reproduction program to be cached may be determined in accordance with duration of activation of the reproduction program, instead of the corresponding contents number. More specifically, only a reproduction program which is to be activated for the longest time period may be determined as the one to be cached, or a plurality of reproduction programs may be stored in the reproduction program storage unit 109 in descending order of the activation duration in so far as the capacity of the storage unit 109 allows.

(4) Obtaining Reproduction Program for Broadcast Programs Transmitted During Specified Service Periods As is the case with Embodiment 2 as a variation of Embodiment 1, a reproduction program to be cached may be selected among those for the contents transmitted over a specified channel during the next or current service period.

<Embodiment 5>

The present embodiment relates to a broadcast reception apparatus that caches a reproduction program that is used for reproducing a specified broadcast program.

Construction

The broadcast reception apparatus in Embodiment 5 has the same construction as Embodiment 1 except for the function of the program-for-cache determining unit 107.

The program-for-cache determining unit 107 refers to the broadcast information stored in the broadcast information storage unit 106 to count the corresponding contents number for each reproduction program that is used for reproducing a viewer-specified broadcast program during the current service period and onward up to the last service period shown in the broadcast information, and determines a reproduction program that has the highest corresponding contents number, as the one to be cached, then determines the service period and channel during and over which the determined reproduction program is to be cached, and notifies the determined service period and channel to the cache unit 108.

Operation

Figure 21:
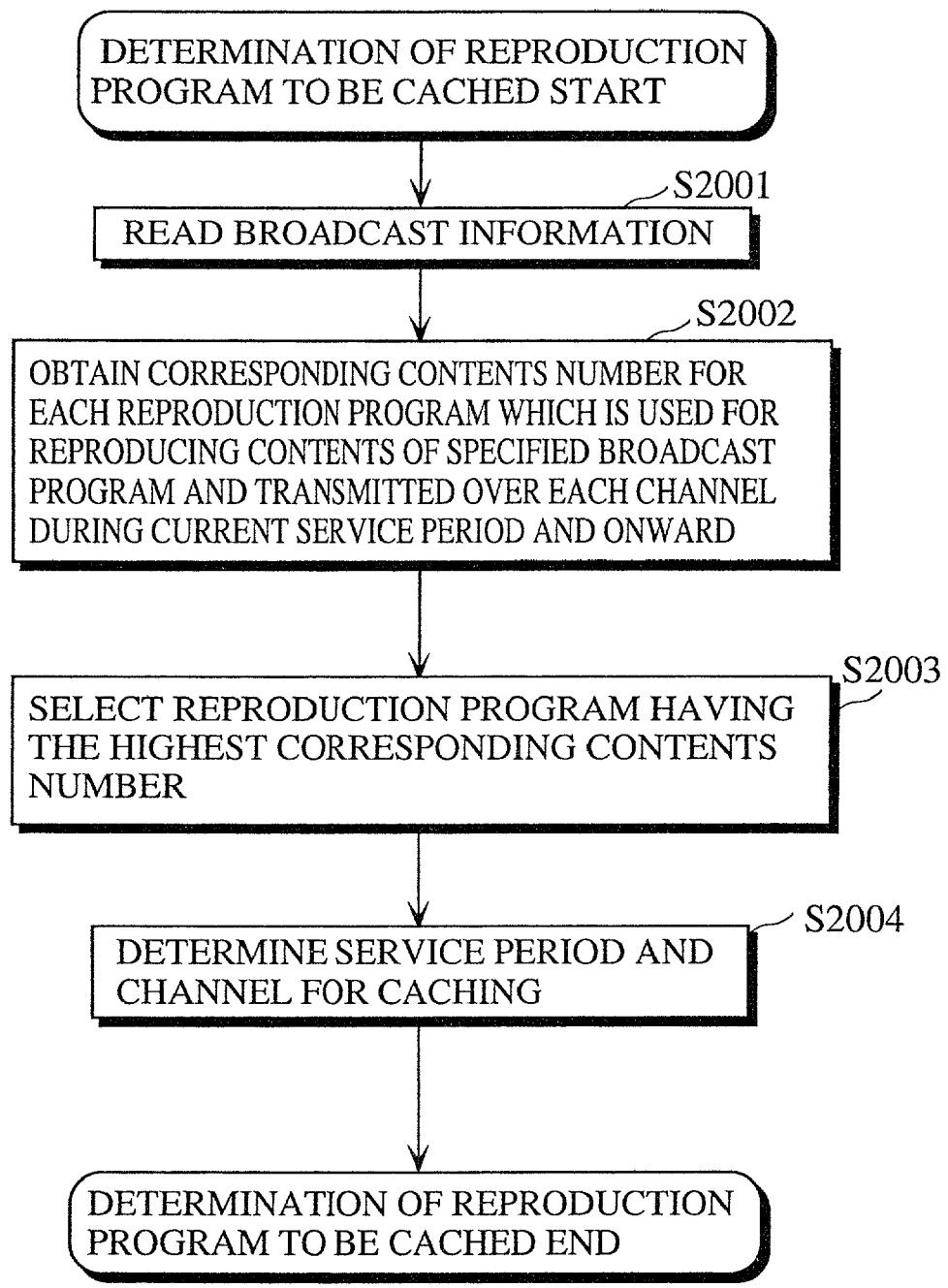
FIG. 21 is a flowchart showing the procedure of the operation for determining a reproduction program to be cached.

FIG. 21 is a flowchart showing the procedure of the operation for determining a reproduction program to be cached.

The program-for-cache determining unit 107 reads the broadcast information shown in FIG. 4 from the broadcast information storage unit 106 (step S2001).

The program-for-cache determining unit 107 then obtains a corresponding contents number based on the broadcast information shown in FIG. 16, for each reproduction program used for reproducing the contents belonging to a specified genre and is transmitted during the current service period and onward up to the last service period shown in the broadcast information. In this example, it is supposed that the current service period is 5:00–7:00. FIG. 22 shows corresponding contents numbers for the reproduction programs used for reproducing the contents of the specified broadcast program, where the viewer specifies broadcast programs with SIDs 1, 8, 15, 20, 24, 29, and 35 (step S2002).

The program-for-cache determining unit 107 determines an XML-compatible reproduction program with PID 1 that has the highest corresponding contents number as shown in FIG. 22, as the one to be cached (step S2003).

The program-for-cache determining unit 107 then refers to the broadcast information shown in FIG. 4 to determine the service period and channel during and over which the reproduction program with PID 1 is to be cached. FIG. 20 shows the service periods and channels during and over which the reproduction program with PID 1 is transmitted. In the present embodiment, the program-for-cache determining unit 107 determines the earliest service period among those shown in FIG. 17 as the one during which the reproduction program is to be cached (when there are a plurality of channels satisfying the condition, any one among them is selected). In this example, the program-for-cache determining unit 107 selects the current service period 5:00–7:00 and channel 1 since the reproduction program with PID 1 is transmitted over channel 1 during the service period 5:00–7:00 (step S2004).

Brief Account

As described above, in the broadcast reception apparatus of the present embodiment, the program-for-cache determining unit 107 obtains a corresponding contents number for each reproduction program that is used for reproducing a viewer-specified broadcast program during the current service period and onward up to the last service period shown in the broadcast information, and determines a reproduction program that has the highest corresponding contents number, as the one to be cached. With this construction, it is possible to store the reproduction program with the highest possibility of being used, in the reproduction program storage unit 109 in advance when the viewer views broadcast programs through the channel the viewer has specified. This reduces the probability that a viewer waits some time before the contents are reproduced.

Up to now, Embodiment 5 of the present invention has been explained. However, the present invention is not limited to Embodiment 5. That is to say, the following variations are also included in the present invention.

(1) Broadcast Program Used for Determining a Reproduction Program to be Cached

In the present embodiment, a reproduction program to be cached is selected among those used for reproducing contents of a viewer-specified broadcast program. However, the reproduction program to be cached may be selected among those among those used for reproducing contents of the following broadcast programs.

(a) Subscribed Broadcast Program

The reproduction program to be cached is selected among those used for reproducing contents of a broadcast program to which the viewer subscribed with the broadcast station.

(b) Preselected Broadcast Program

The broadcast reception apparatus may be provided with a means for obtaining a broadcast program that has been preselected by the viewer. A reproduction program to be cached is then selected among those used for reproducing contents of the broadcast program preselected by the viewer.

(c) Broadcast Program Having Been Viewed Highest Number of Times

The broadcast reception apparatus may be provided with a means that stores information showing history of the broadcast programs having been viewed by the viewer. A reproduction program to be cached is then selected among those having been viewed the highest number of times by the viewer.

(2) Time Period Used for Determining a Reproduction Program to be Cached

In the present embodiment, a reproduction program that has the highest corresponding contents number is selected as the one to be cached, among reproduction programs for broadcast programs transmitted over a specified channel during the current service period and onward up to the last service period of the day. However, as is the case with a variation of Embodiment 1, the reproduction program to be cached the highest corresponding contents number may be selected among reproduction programs for broadcast programs transmitted during several days or during several hours starting with the current service period.

(3) Determining a Reproduction Program to be Cached

In the present embodiment, a reproduction program that has the highest corresponding contents number is selected as the one to be cached. However, as is the case with a variation of Embodiment 1, a plurality of reproduction programs may be stored in the reproduction program storage unit 109 in descending order of the corresponding contents number in so far as the capacity of the storage unit 109 allows.

Alternatively, a reproduction program to be cached may be determined in accordance with duration of activation of the reproduction program, instead of the corresponding contents number. More specifically, only a reproduction program which is to be activated for the longest time period may be determined as the one to be cached, or a plurality of reproduction programs may be stored in the reproduction program storage unit 109 in descending order of the activation duration in so far as the capacity of the storage unit 109 allows.

(4) Obtaining Reproduction Program for Broadcast Programs Transmitted During Specified Service Periods As is the case with Embodiment 2 as a variation of Embodiment 1, a reproduction program to be cached may be selected among those for the contents transmitted over a specified channel during the next or current service period.

<Embodiment 6>

The present embodiment relates to a broadcast reception apparatus that caches a reproduction program that has been cached the highest number of times.

Construction

The broadcast reception apparatus in Embodiment 6 has the same construction as Embodiment 1 except for a cache history storage unit that is newly added and the function of the program-for-cache determining unit 107.

The cache history storage unit stores cache history information. FIG. 23 shows an example of cache history information for one past week. As shown in FIG. 23, the number of the times each reproduction program was cached during one week is recorded.

The program-for-cache determining unit 107 refers to the cache history information and determines a reproduction program that has been cached the highest number of times, as the one to be cached, then determines the service period and channel during and over which the determined reproduction program is to be cached, and notifies the determined service period and channel to the cache unit 108.

Operation

Figures 24, 25:
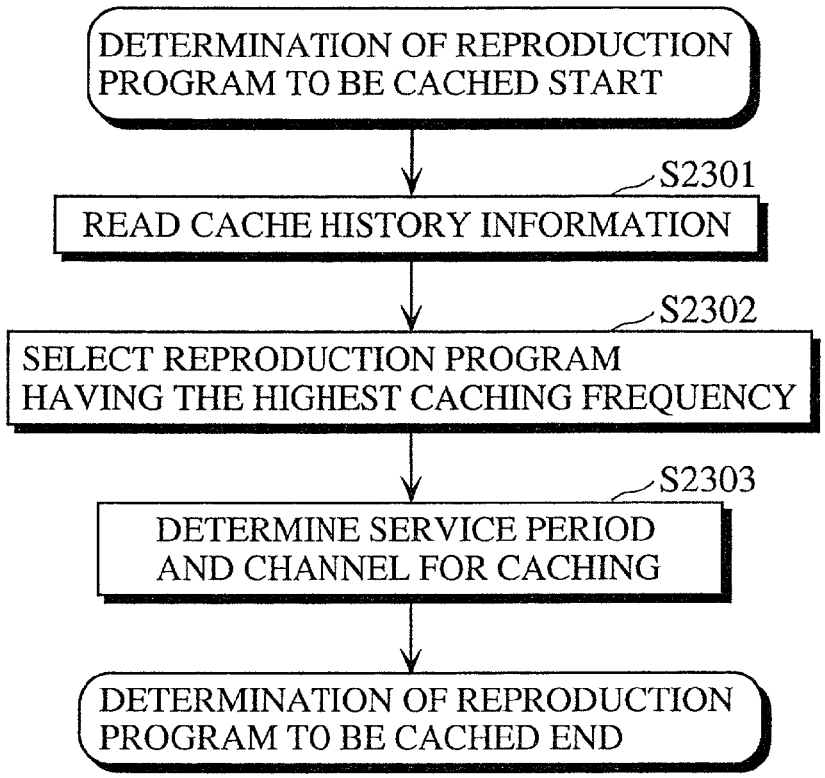
FIG. 24 is a flowchart showing the procedure of the operation for determining a reproduction program to be cached.
FIG. 25 shows the service periods and channels during and over which the reproduction program with PID 4 is transmitted.

FIG. 24 is a flowchart showing the procedure of the operation for determining a reproduction program to be cached.

The program-for-cache determining unit 107 reads the cache history information from the cache history storage unit (step S2301).

The program-for-cache determining unit 107 determines a DVX-compatible reproduction program with PID 4 that was cached the highest number of times, as shown in FIG. 23, as the one to be cached (step S2302).

The program-for-cache determining unit 107 then refers to the broadcast information shown in FIG. 4 to determine the service period and channel during and over which the reproduction program with PID 4 is to be cached. FIG. 25 shows the service periods and channels during and over which the reproduction program with PID 4 is transmitted. In the present embodiment, the program-for-cache determining unit 107 determines the earliest service period among those shown in FIG. 25 as the one during which the reproduction program is to be cached (when there are a plurality of channels satisfying the condition, any one among them is selected). In this example, the program-for-cache determining unit 107 selects the current service period 5:00–7:00 and channel 4 since the reproduction program with PID 4 is transmitted over channel 4 during the service period 5:00–7:00 (step S2303).

Brief Account

As described above, in the broadcast reception apparatus of the present embodiment, the program-for-cache determining unit 107 refers to the cache history information and determines a reproduction program that has been cached the highest number of times, as the one to be cached. With this construction, it is possible to store the reproduction program with the highest possibility of being used, in the reproduction program storage unit 109 in advance. This is because the reproduction program has already been selected in past as a reproduction program having the highest possibility of being used. As a result, it is possible to predict a reproduction program having the highest possibility of use when the cached reproduction program is actually used with a high frequency.

Up to now, Embodiment 6 of the present invention has been explained. However, the present invention is not limited to Embodiment 6. That is to say, the following variations are also included in the present invention.

(1) Cache Hit Rate

In the present embodiment, a reproduction program that has been cached the highest number of times is selected as the one to be cached. However, a rate of actually used reproduction programs in those having been cached (cache hit rate) may be calculated, then a reproduction program with the highest cache hit rate may be determined as the one to be cached.

(2) Time Period Used For Determining a Reproduction Program to be Cached

In the present embodiment, a reproduction program that has been cached the highest number of times during one past week, is determined as the one to be cached. However, a reproduction program that has been cached the highest number of times during several days or during several hours starting with the current service period may be determined as the one to be cached.

(3) Determining a Reproduction Program to be Cached

In the present embodiment, a reproduction program that has been cached the highest number of times is selected as the one to be cached. However, as is the case with a variation of Embodiment 1, a plurality of reproduction programs may be stored in the reproduction program storage unit 109 in descending order of the number of times the reproduction program is cached, in so far as the capacity of the storage unit 109 allows.

Alternatively, a reproduction program to be cached may be determined in accordance with duration of activation of the reproduction program, instead of the number of times the reproduction program is cached, or the cache hit rate. More specifically, among those that have been cached a certain number of times or more, or those that have a certain hit rate or higher, only a reproduction program that is activated for the longest time period may be determined as the one to be cached, or a plurality of reproduction programs may be stored in the reproduction program storage unit 109 in descending order of the activation duration in so far as the capacity of the storage unit 109 allows.

(4) Obtaining Reproduction Program For Broadcast Programs Transmitted During Specified Service Periods As is the case with Embodiment 2 as a variation of Embodiment 1, a reproduction program to be cached may be selected among those for the contents transmitted over a specified channel during the next or current service period.

<Embodiment 7>

The present embodiment relates to a broadcast reception apparatus that backs up reproduction programs stored in the reproduction storage unit 109.

Construction

Figure 26:
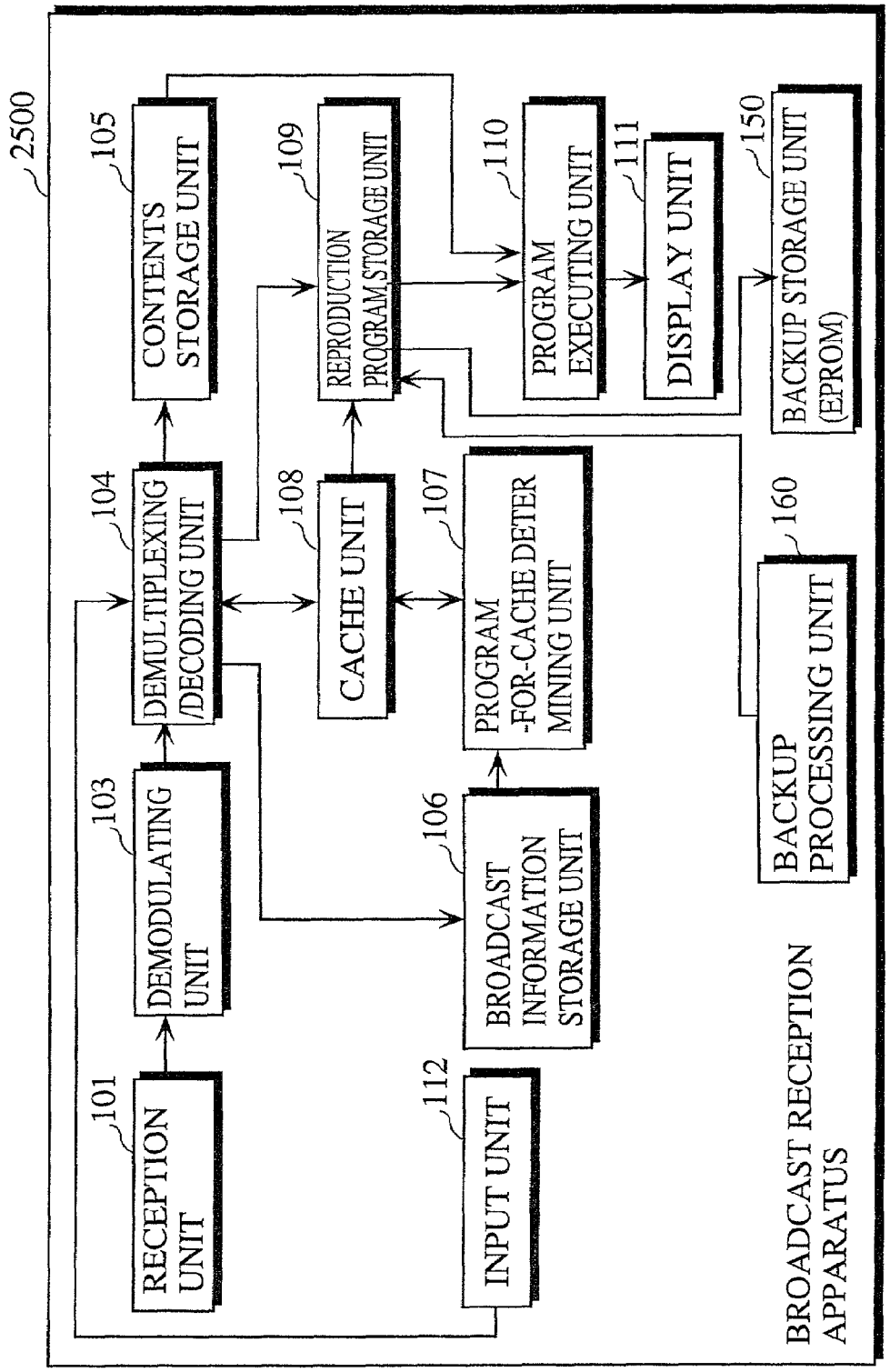
FIG. 26 is a block diagram showing the construction of the broadcast reception apparatus in Embodiment 7.

FIG. 26 is a block diagram showing the construction of the broadcast reception apparatus in Embodiment 7. The broadcast reception apparatus 2500 in Embodiment 7 additionally includes a backup storage unit 150 and a backup processing unit 160, as well as the components of the broadcast reception apparatus 100 in Embodiment 1 which are shown in FIG. 6.

The backup storage unit 150, being a writable nonvolatile memory (EPROM), stores copies of reproduction programs stored in the reproduction program storage unit 109 which is a volatile memory (RAM).

The backup processing unit 160 creates copies of the reproduction programs stored in the reproduction program storage unit 109 every certain time period, and stores the created copies in the backup storage unit 150. The backup processing unit 160 stores the copies of the reproduction programs stored in the backup storage unit 150 into the reproduction program storage unit 109 in the power-on or during a restoration process from a power failure.

Brief Account

As described above, in the broadcast reception apparatus of the present embodiment, the reproduction programs stored in the reproduction program storage unit 109 are backed up at regular time intervals into the backup storage unit 150 which is a nonvolatile memory. With this construction, there is no need of obtaining the reproduction programs when the viewer switches on the next day or when a power failure occurs. This reduces the probability that a viewer waits some time before the contents are reproduced.

In the present embodiment, all the reproduction programs stored in the reproduction program storage unit 109 (volatile memory) are backed up into the backup storage unit 150 (nonvolatile memory). However, reproduction programs having high corresponding contents numbers, long activation duration, high number of times they have been cached, or high cache hit rates may be given a high priority in the backup.

<Embodiment 8>

The present embodiment relates to a broadcast reception apparatus that includes a program storage unit composed of a RAM and an EPROM, checks the amount of unallocated space in the RAM and the EPROM when a reproduction program is cached, and stores the reproduction program into either of the RAM and the EPROM that has enough amount of unallocated space to store the reproduction program.

Construction

Figure 27:
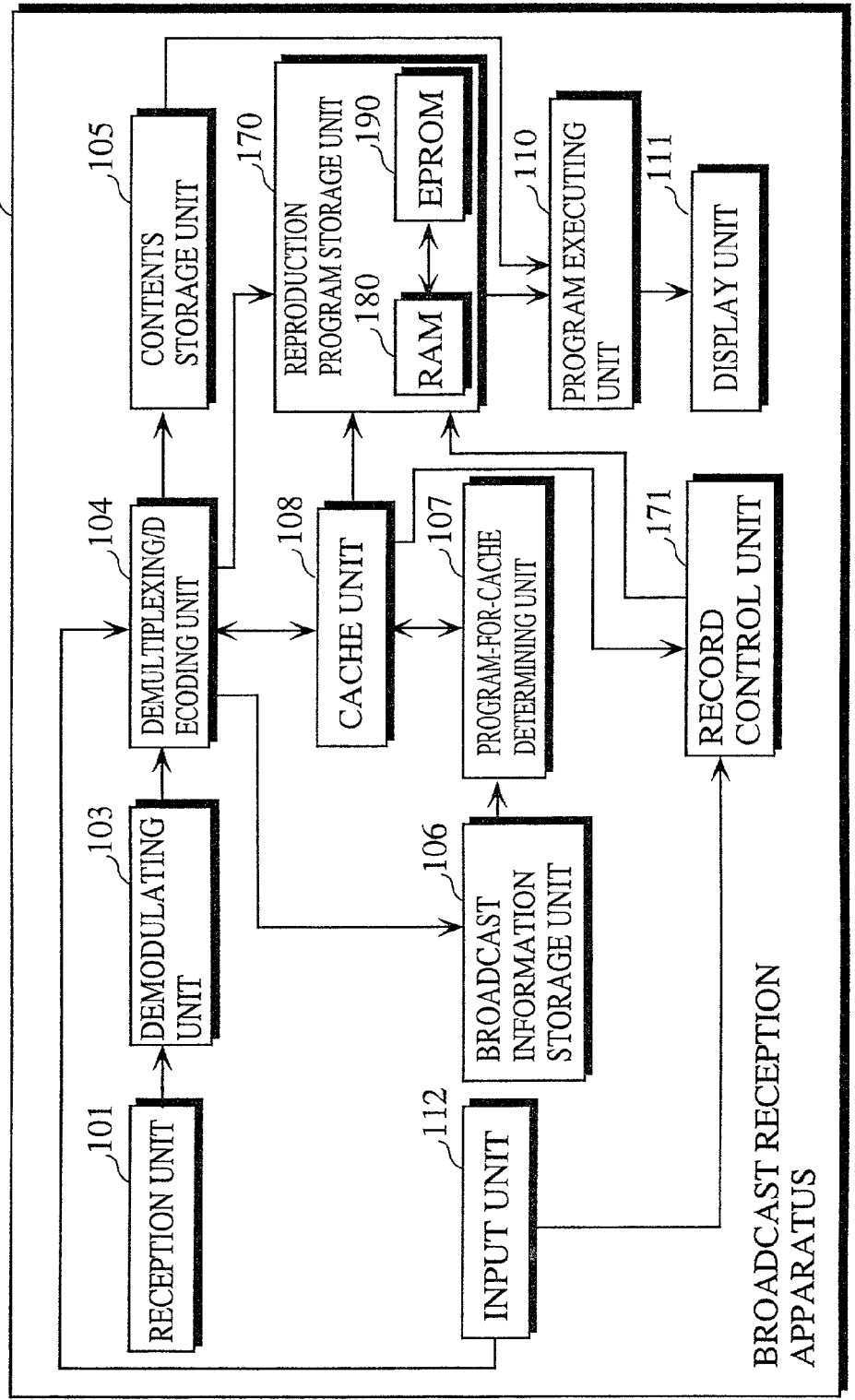
FIG. 27 is a block diagram showing the construction of the broadcast reception apparatus in Embodiment 8.

FIG. 27 is a block diagram showing the construction of the broadcast reception apparatus in Embodiment 8. The broadcast reception apparatus 2800 in Embodiment 8 differs from the broadcast reception apparatus 100 in Embodiment 1 shown in FIG. 6 in that the reproduction program storage unit 170 has a different construction and that the apparatus 2800 additionally includes a record control unit 171.

The reproduction program storage unit 170 is composed of a volatile memory (RAM) 180 and a writable nonvolatile memory (EPROM) 190.

The record control unit 171, according to an instruction by the cache unit 108, checks the amount of unallocated space in the RAM 180 and the EPROM 190 when a reproduction program is cached. The record control unit 171 obtains the size of the reproduction program to be cached based on its type. The information on the size of the reproduction program may be stored in the broadcast reception apparatus, or may be included in the broadcast information transmitted from the broadcasting apparatus.

The record control unit 171 stores the reproduction program into either of the RAM and the EPROM that has enough amount of unallocated space to store the reproduction program. When both memories have enough amount of unallocated space, the record control unit 171 stores the reproduction program into the RAM 180 that has a faster accessing speed. When neither memory has enough amount of unallocated space, the record control unit 171 does not record the reproduction program.

Brief Account

As described above, the broadcast reception apparatus of the present embodiment checks the amount of unallocated space in a volatile memory and a nonvolatile memory when a reproduction program is cached, and stores the reproduction program into either memory that has enough amount of unallocated space to store the reproduction program. With this construction, the reproduction program storage unit 170 is used efficiently.

In the present embodiment, when neither memory has enough amount of unallocated space, the reproduction program is not stored. However, a latest-cached reproduction program may be given a high priority in being stored in the RAM. In this case, the latest-cached reproduction program may be stored in the RAM regardless of whether the RAM has unallocated space. Alternatively, a reproduction program that has a high possibility of being used in near future may be stored in the RAM. In this case, the reproduction program is deleted from the RAM after it is executed. Also, a reproduction program that has a high possibility of being used in the next service period may be transferred from the EPROM to the RAM. In this case, the reproduction program to be cached may be stored in the EPROM.

<Embodiment 9>

The present embodiment relates to a broadcast reception apparatus that includes a program storage unit composed of a RAM and an EPROM, and records a reproduction program to be cached into either of the RAM and the EPROM according to its corresponding contents number when the reproduction program is cached.

Construction

The broadcast reception apparatus in the present embodiment has the same construction as the broadcast reception apparatus 2600 in Embodiment 8 that is shown in FIG. 27, except that the reproduction program storage unit 170 stores the broadcast information as well and except for the function of the record control unit 171.

The reproduction program storage unit 170 stores reproduction programs and the reproduction program information which include the corresponding contents numbers and the size of the stored reproduction programs. FIG. 28 shows an example of the reproduction program information. As shown in FIG. 28, the reproduction program information includes, for each of the RAM and EPROM, a storage capacity, an amount of unallocated space, types of stored reproduction programs, and corresponding contents numbers and size of the reproduction programs.

The record control unit 171, upon receipt of an instruction from the cache unit 108 to cache a reproduction program, refers to the reproduction program information in the reproduction program storage unit 109 and first records in the RAM 180 the reproduction programs that have high corresponding contents numbers.

Operation

Figure 29:
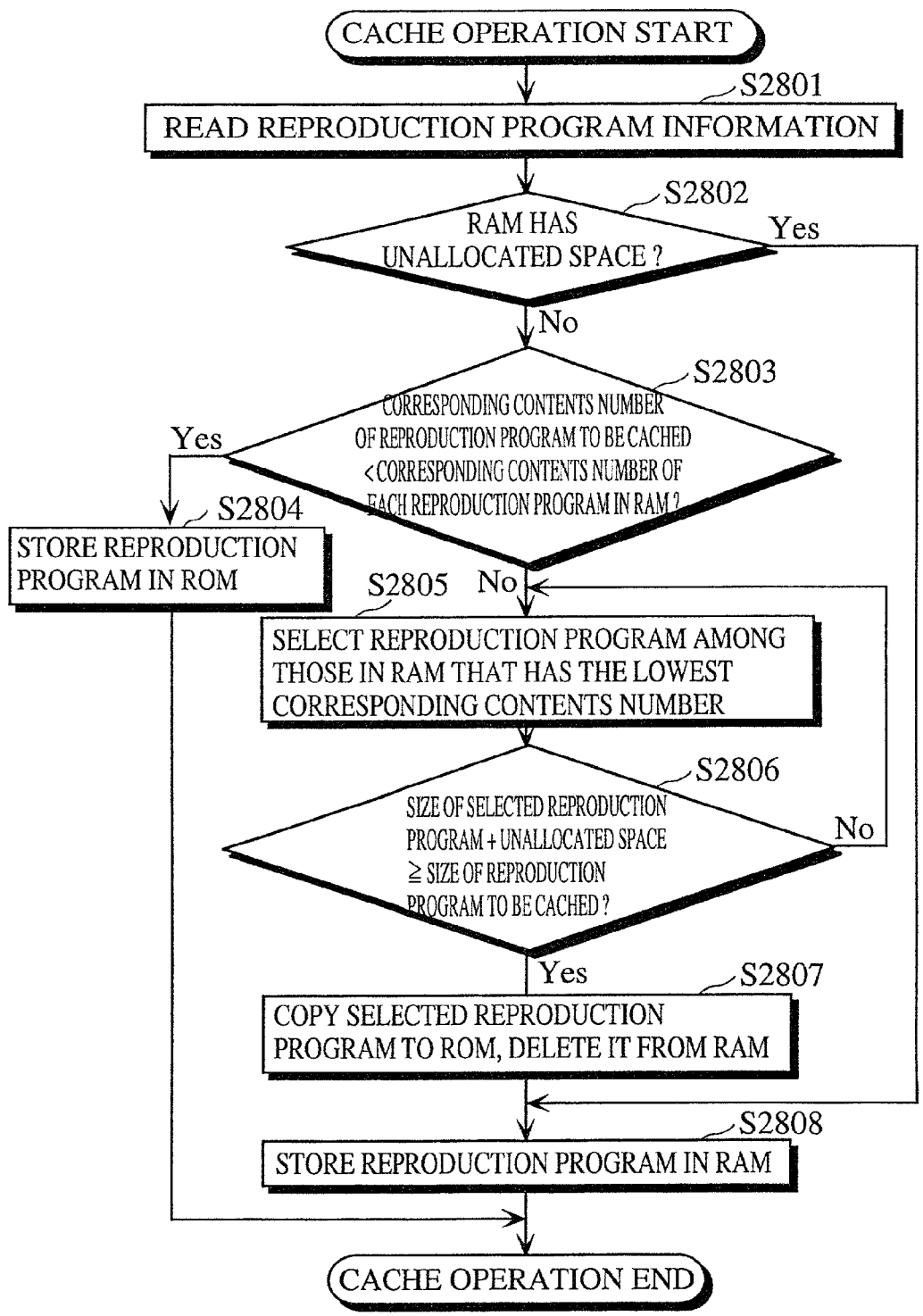
FIG. 29 is a flowchart showing the procedure of the cache operation.

FIG. 29 is a flowchart showing the procedure of the cache operation.

The record control unit 171 reads the reproduction program information from the reproduction program storage unit 170. It is supposed here as an example that the reproduction program information shown in FIG. 28 is read (step S2801).

The record control unit 171 then refers to the reproduction program information to check if the RAM 180 has enough unallocated space to store the reproduction program to be cached. When the RAM 180 has enough unallocated space, the record control unit 171 stores the reproduction program to be cached, into the RAM 180. Suppose that, for example, a reproduction program with PID 3 is to be cached, and that the size of the reproduction program is 80K. In this example, the RAM has 20K of unallocated space. As a result, the reproduction program is not stored in the RAM 180 (steps S2802, S2808).

When the RAM 180 does not have enough unallocated space, the record control unit 171 refers to the broadcast information to obtain the corresponding contents number (N1) of the reproduction program to be cached. The record control unit 171 then compares N1 with the corresponding contents number (N2) of each reproduction program stored in the RAM 180. When N1 is lower than each value for N2, the record control unit 171 stores the reproduction program to be cached in the EPROM 190. Suppose that, for example, the corresponding contents number of the reproduction program to be cached is "5", and that the RAM stores reproduction programs with PIDs "2" and "1" and the corresponding contents numbers thereof are "3" and "4", respectively. Accordingly, the reproduction program to be cached (PID=3) is not stored in the EPROM 190 (steps S2803, S2804).

When the corresponding contents number of the reproduction program to be cached is higher than that of any reproduction program stored in the RAM 180, the record control unit 171 selects a reproduction program among those in the RAM 180 that has the lowest corresponding contents number. In the present example, a reproduction program with PID 2 having corresponding contents number "3" is selected. The record control unit 171 adds up the size of the selected reproduction program and the amount of unallocated space in the RAM 180, and when the result value is smaller than the size of the reproduction program to be cached, selects a reproduction program that has the second-lowest corresponding contents number, among those in the RAM 180 that have corresponding contents numbers lower than that of the reproduction program to be cached. In the present example, a total of the size (50K) of the selected reproduction program with PID 2 and the amount of unallocated space (20K) in the RAM 180 is 70K, which is smaller than the size (80K) of the reproduction program to be cached. Accordingly, a reproduction program that has the second-lowest corresponding contents number, i.e., the reproduction program with PID 1, is selected. A total of the size (70K) of the selected reproduction program with PID 1 and the amount of unallocated space (20K) of the RAM 180 is 90K, which is larger than the size (80K) of the reproduction program to be cached. Accordingly, control moves to step S2807 (steps S2805, S2806).

When a total of the size of the selected reproduction program and the amount of unallocated space of the RAM is larger than the size of the reproduction program to be cached, the record control unit 171 copies the selected reproduction program to the EPROM 190, then deletes the selected reproduction program from the RAM 180. In the present example, the reproduction program with PID 1 is copied to the EPROM 190, and it is deleted from the RAM 180 (step S2807).

The record control unit 171 stores the reproduction program to be cached into the RAM 180. In the present example, the reproduction program with PID 3 is stored in the RAM 180 (step S2808).

Brief Account

In the broadcast reception apparatus in the present embodiment, the record control unit 171 first stores a reproduction program having high corresponding contents number (i.e., a reproduction program having a high possibility of being used) into the RAM 180 that has a fast accessing speed, when a reproduction program is cached. This reduces the activation time period of the reproduction program when it is used. This reduces the probability that a viewer waits some time before the contents are reproduced.

In the present embodiment, whether a reproduction program to be cached is recorded in a RAM or an EPROM is determined according to the corresponding contents number of the reproduction program. However, the memory for storing the reproduction program to be cached may be determined in accordance with the number of times the reproduction program is cached, or the cache hit rate. More specifically, a reproduction program having been cached a high number of times or a reproduction program having a high cache hit rate is given a high priority in being recorded in the RAM 180 which has a fast accessing speed since such a reproduction program has a high possibility of being used.

In the present embodiment, a reproduction program having a high possibility of being used, such as the one having a high corresponding contents number, is given a high priority in being recorded into a RAM that has a fast accessing speed. However, in the case of a temporary power off due to, for example, a power failure, reproduction programs recorded in a RAM are deleted, which requires the reproduction programs to be re-obtained, and therefore causes the viewer to wait some time before the contents are reproduced. To prevent such an inconvenience, a reproduction program having a high possibility of being used, such as the one having a high corresponding contents number, long activation duration, a high number of times it has been cached, or a high cache hit rate may be given a high priority in being recorded into an EPROM that retain data even if the power is switched off.

<Embodiment 10>

The present embodiment relates to a broadcast reception apparatus that determines whether a reproduction program to be cached should be recorded in a RAM or an EPROM in accordance with the activation duration of the reproduction program.

Construction

The broadcast reception apparatus in the present embodiment has the same construction as the broadcast reception apparatus in Embodiment 9 except for the reproduction program information stored in the reproduction program storage unit 170 and the function of the record control unit 171.

The reproduction program storage unit 170 stores the reproduction program information that shows activation duration and size of the reproduction programs. FIG. 30 shows an example of the reproduction program information. As shown in FIG. 30, the reproduction program information includes, for each of the RAM and EPROM, a storage capacity, an amount of unallocated space, types of stored reproduction programs, and activation duration and size of the reproduction programs. It should be noted here that the activation duration indicates a time period between the start and end of the activation of the reproduction program on a RAM.

The record control unit 171, upon receipt of an instruction from the cache unit 108 to cache a reproduction program, refers to the reproduction program information in the reproduction program storage unit 109 and first records in the RAM 180 the reproduction programs that have long activation duration.

Operation

Figure 31:
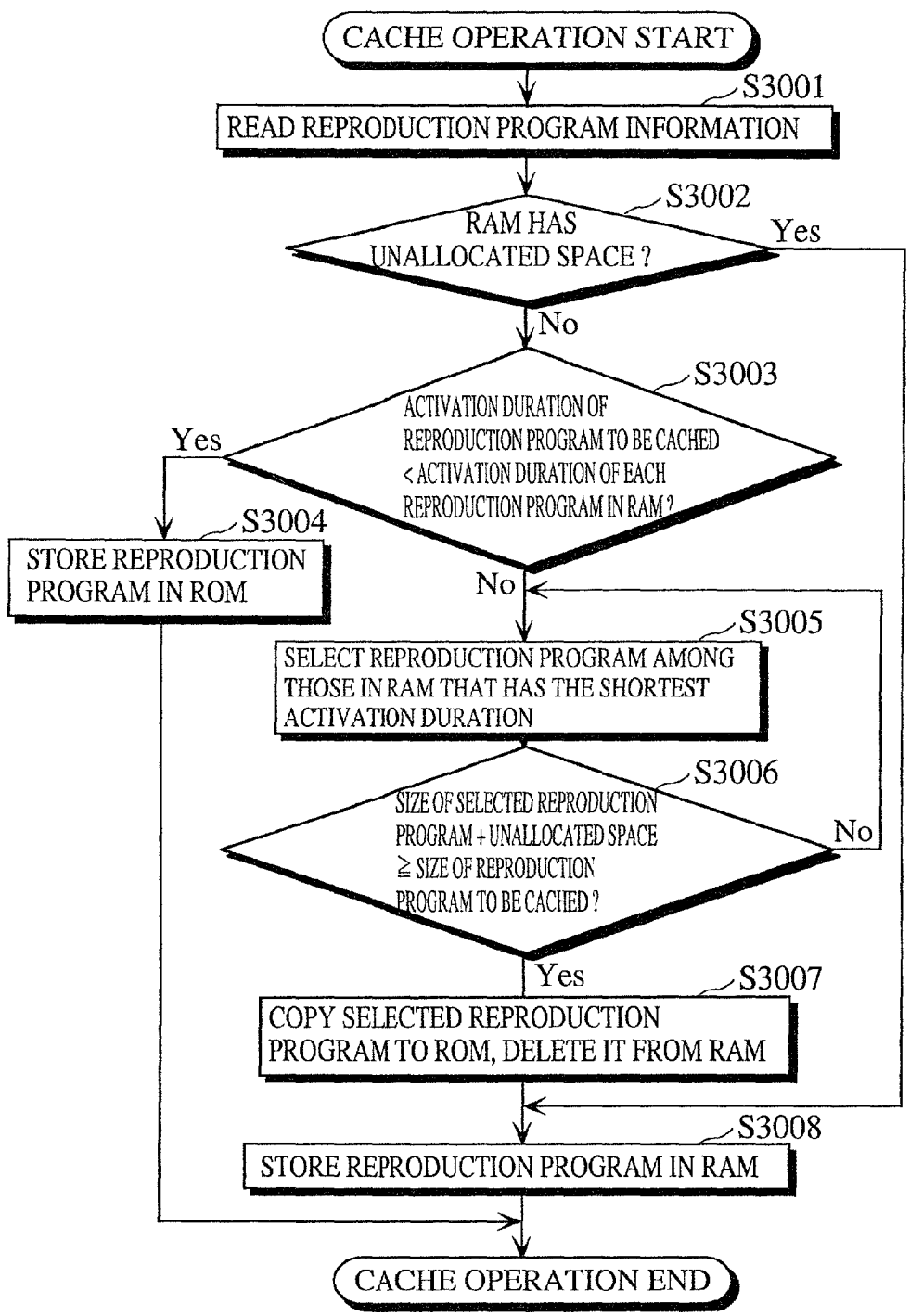
FIG. 31 is a flowchart showing the procedure of the record control.

FIG. 31 is a flowchart showing the procedure of the record control.

The record control unit 171 reads the reproduction program information from the reproduction program storage unit 170. It is supposed here as an example that the reproduction program information shown in FIG. 30 is read (step S3001).

The record control unit 171 then refers to the reproduction program information to check if the RAM 180 has enough unallocated space to store the reproduction program to be cached. When the RAM 180 has enough unallocated space, the record control unit 171 stores the reproduction program to be cached, into the RAM 180. Suppose that, for example, a reproduction program with PID 3 is to be cached, and that the size of the reproduction program is 80K. In this example, the RAM has 20K of unallocated space. As a result, the reproduction program is not stored in the RAM 180 (steps S3002, S3008).

When the RAM 180 does not have enough unallocated space, the record control unit 171 detects the activation duration (D1) of the reproduction program to be cached. The record control unit 171 then compares D1 with the activation duration (D2) of each reproduction program stored in the RAM 180. When D1 is lower than each value for D2, the record control unit 171 stores the reproduction program to be cached in the EPROM 190. Suppose that, for example, the activation duration of the reproduction program to be cached is "5 seconds", and that the RAM stores reproduction programs with PIDs "2" and "1" and the activation duration thereof are "3 seconds" and "4 seconds", respectively. Accordingly, the reproduction program to be cached is not stored in the EPROM 190 (steps S3003, S3004).

When the activation duration of the reproduction program to be cached is longer than that of any reproduction program having already been stored in the RAM 180, the record control unit 171 selects a reproduction program among those in the RAM 180 that has the shortest activation duration. In the present example, a reproduction program with PID 2 having activation duration "3 seconds" is selected. The record control unit 171 adds up the size of the selected reproduction program and the amount of unallocated space in the RAM 180, and when the result value is smaller than the size of the reproduction program to be cached, selects a reproduction program that has the second-shortest activation duration, among those in the RAM 180 that have activation duration shorter than that of the reproduction program to be cached. In the present example, a total of the size (50K) of the selected reproduction program with PID 2 and the amount of unallocated space (20K) in the RAM 180 is 70K, which is smaller than the size (80K) of the reproduction program to be cached. Accordingly, a reproduction program that has the second-shortest activation duration, i.e., the reproduction program with PID 1, is selected. A total of the size (70K) of the selected reproduction program with PID 1 and the amount of unallocated space (20K) of the RAM 180 is 90K, which is larger than the size (80K) of the reproduction program to be cached. Accordingly, control moves to step S3007 (steps S3005, S3006).

When a total of the size of the selected reproduction program and the amount of unallocated space of the RAM is larger than the size of the reproduction program to be cached, the record control unit 171 copies the selected reproduction program to the EPROM 190, then deletes the selected reproduction program from the RAM 180. In the present example, the reproduction program with PID 1 is copied to the EPROM 190, and it is deleted from the RAM 180 (step S3007).

The record control unit 171 stores the reproduction program to be cached into the RAM 180. In the present example, the reproduction program with PID 3 is stored in the RAM 180 (step S3008).

Brief Account

In the broadcast reception apparatus in the present embodiment, the record control unit 171 first stores a reproduction program that takes a long time for the activation into the RAM 180 that has a fast accessing speed, when a reproduction program is cached. This reduces the activation duration of the reproduction program when it is used. This reduces the probability that a viewer waits some time before the contents are reproduced.

<Embodiment 11>

The present embodiment relates to a broadcast reception apparatus that stores cached reproduction programs into an EPROM when the power is switched off.

Construction

The broadcast reception apparatus in the present embodiment has the same construction as the broadcast reception apparatus 2600 in Embodiment 8 that is shown in FIG. 27, except that the reproduction program storage unit 170 stores the reproduction program information as well and except for the function of the record control unit 171.

The reproduction program storage unit 170 stores reproduction programs and the reproduction program information which include the corresponding contents numbers and the size of the stored reproduction programs. FIG. 32 shows an example of the reproduction program information.

The record control unit 171, upon receipt of an instruction to power off from the viewer via the input unit 112, performs a shut-down process in which the unit 171 copies a reproduction program that has the highest corresponding contents number, among the reproduction programs stored in the RAM 180, to the EPROM 190, and deletes from the EPROM 190 a reproduction program that has the lowest corresponding contents number among those stored in the EPROM 190.

Operation

Figure 33:
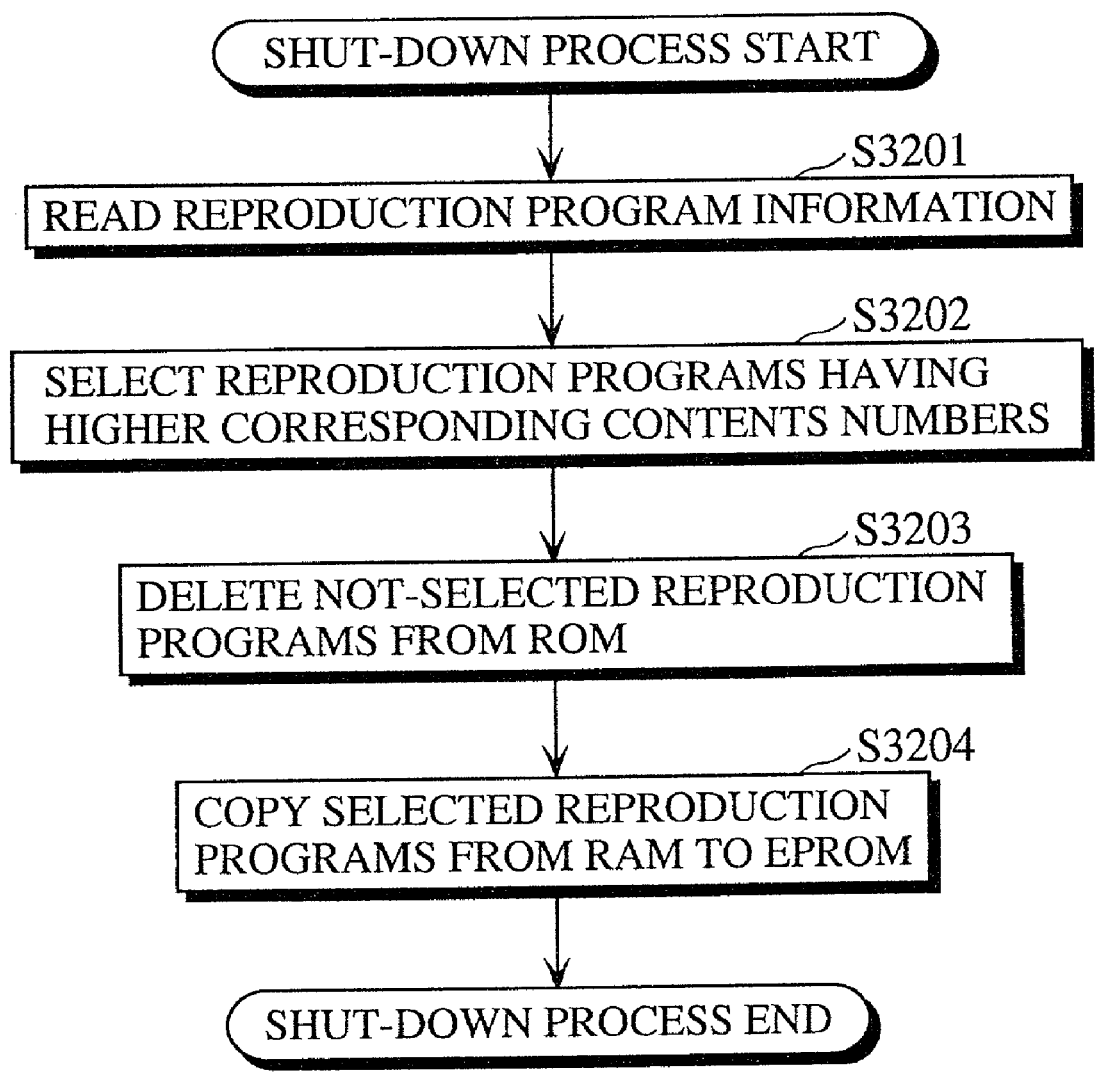
FIG. 33 is a flowchart showing the procedure of the shut-down process.

FIG. 33 is a flowchart showing the procedure of the shut-down process.

The record control unit 171 reads the reproduction program information from the reproduction program storage unit 170. It is supposed here as an example that the reproduction program information shown in FIG. 32 is read (step S3201).

The record control unit 171 then selects reproduction programs one by one in descending order of the corresponding contents number in so far as the capacity of the EPROM 190 allows. In the present example, the EPROM 190 has a capacity of 140 k. As a result, the record control unit 171 selects a reproduction program with PID 2 (50K in size) having corresponding contents number "4" and a reproduction program with PID 1 (80K in size) having corresponding contents number "3" (step S3202).

The record control unit 171 deletes reproduction programs not selected in the above step, from the EPROM 190. In the present example, a reproduction program with PID 4 is deleted (step S3203).

The record control unit 171 copies a reproduction program selected in the step S3202, from the RAM 180 to the EPROM 190. In the present example, the record control unit 171 copies a reproduction program with PID 2 to the EPROM 190 (step S3204).

Brief Account

In the broadcast reception apparatus in the present embodiment, the record control unit 171 retains in the EPROM 190 a reproduction program having the highest corresponding contents number (i.e., a reproduction program having a high possibility of being used) before the apparatus is powered off. This reduces the probability that a reproduction program needs to be re-obtained when the apparatus is powered on next time. This reduces the probability that a viewer waits some time before the contents are reproduced.

In the present embodiment, a reproduction program having the highest corresponding contents number is retained in the EPROM. However, any kind of reproduction program may be retained in the EPROM in so far as it reduces the probability that a viewer waits some time before the contents are reproduced. For example, a reproduction program having a high number of times it has been cached, or a high cache hit rate, or long activation duration may be preferentially retained in the EPROM 190.

<Embodiment 12>

The present embodiment relates to a broadcast reception apparatus that backs up reproduction programs stored in the reproduction storage unit 109.

Construction

Figure 34:
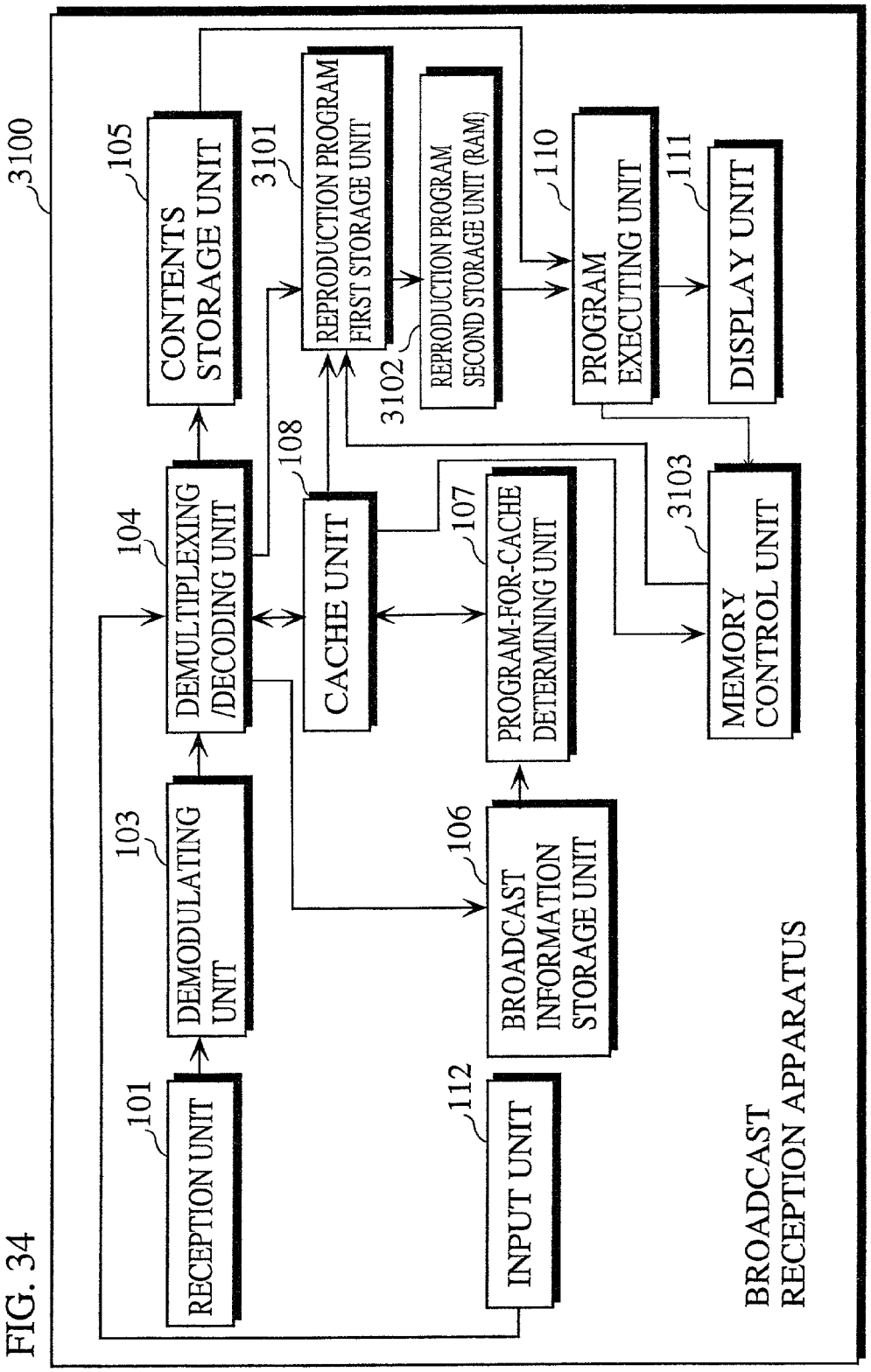
FIG. 34 is a block diagram showing the construction of the broadcast reception apparatus in Embodiment 12.

FIG. 34 is a block diagram showing the construction of the broadcast reception apparatus in Embodiment 12. The broadcast reception apparatus 3100 in Embodiment 12 has almost the same construction as the broadcast reception apparatus 100 in Embodiment 1 which are shown in FIG. 6. The following is a description of the construction unique to the broadcast reception apparatus in Embodiment 12.

The reproduction program first storage unit 3101 is a writable nonvolatile memory (hard disk), and stores reproduction programs cached by the cache unit 108. The reproduction program second storage unit 3102 is a volatile memory (RAM), and stores reproduction programs that are executed by the program executing unit 110.

The memory control unit 3103, when the program executing unit 110 executes a reproduction program to reproduce a corresponding content stored in the contents storage unit 105 and cannot find the reproduction program in the reproduction program second storage unit 3102, searches the reproduction program first storage unit 3102 for the reproduction program, and when succeeding in finding the reproduction program, copies the reproduction program to the reproduction program second storage unit 3102.

Also, the memory control unit 3103 selects reproduction programs one by one at regular intervals in descending order of the corresponding contents number, among the reproduction programs stored in the reproduction program first storage unit 3101, and copies the selected reproduction programs to the reproduction program second storage unit 3102 in so far as the capacity of the reproduction program second storage unit 3102 allows.

Brief Account

As described above, the broadcast reception apparatus of the present embodiment copies, at regular time intervals, reproduction programs having a high possibility of being used among those stored in the reproduction program first storage unit 3101 being a nonvolatile memory, to the reproduction program second storage unit 3102 being a volatile memory. With this construction, it is possible, in advance, to store reproduction programs having a high possibility of being used, in a volatile memory which is accessed when a reproduction program is executed.

In the present embodiment, reproduction programs having high corresponding contents numbers are preferentially copied. However, reproduction programs having long activation duration, high number of times they have been cached, or high cache hit rates may be preferentially copied. Furthermore, when the reproduction program first storage unit 3101 has enough space to store all these types of reproduction programs, all these reproduction programs may be copied to the reproduction program first storage unit 3101.

Also, a reproduction program stored in the reproduction program first storage unit 3101 may be copied immediately before the corresponding content is broadcast, instead of being copied at regular time intervals. Also, reproduction programs may be moved, not copied, to the reproduction program second storage unit 3102.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcast reception apparatus for receiving contents and reproduction programs that correspond to types of the contents, and reproducing the contents by executing the reproduction programs, the broadcast reception apparatus comprising:

a receiving unit for receiving broadcast information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, and also shows genres to which the contents belong, the reproduction program determining unit includes:

a storage unit for storing history information that shows history of genres to which contents having been viewed belong;

a contents identifying unit for identifying, by referring to the history information, genres that correspond to contents that have been viewed a predetermined number of times or more, and identify, by referring to the broadcast information, contents that belong to the identified genres, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs, wherein the contents identifying unit identifies, as viewing candidate contents, contents that are transmitted during a predetermined time period after the current time, among the viewing candidate contents identified by the contents identifying unit by referring to the broadcast information, and the determining unit, when there are a plurality of candidate reproduction programs, determines preferentially a reproduction program having the longest activation duration as the reproduction program to be cached.

2. The broadcast apparatus of claim 1, wherein the second service period is before the first service period.

3. A broadcast reception apparatus for receiving contents and reproduction programs that correspond to types of the contents, and reproducing the contents by executing to reproduction programs, the broadcast reception apparatus comprising:

a receiving unit for receiving broadcast information which shows for each content a first set or a first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, and also shows genres to which the contents belong, the reproduction program determining unit includes:

a storage unit for storing history information that shows history of genres to which contents having been viewed belong;

a contents identifying unit for identifying, by referring to the history information, genres that correspond to contents that have been viewed a predetermined number of times or more, and identity, by referring to the broadcast information, contents that belong to the identified genres, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs, wherein the contents identifying unit identifies, as viewing candidate contents, contents that are transmitted during a predetermined time period after the current time, among the viewing candidate contents identified by the contents identifying unit by referring to the broadcast information, the determining unit when there are a plurality of candidate reproduction programs, determines preferentially a candidate reproduction program that corresponds to the highest number of viewing candidate contents, as the reproduction program to be cached, the reproduction program storage unit includes a volatile memory and a nonvolatile memory, the caching unit caches the reproduction program to either to volatile memory or the nonvolatile memory, and the caching unit detects activation duration for each received reproduction program, and stores preferentially a reproduction program having the longest activation duration into the volatile memory.

4. The broadcast apparatus of claim 3, wherein to second service period is before the first service period.

5. A broadcast reception apparatus for receiving contents and reproduction programs that correspond to types of the contents, and reproducing the contents by executing to reproduction programs, the broadcast reception apparatus comprising:

a receiving unit for receiving broadcast information which shows for each content a fist set of first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unity and store the received, predicted reproduction program in a reproduction program storage unit, wherein each reproduction program is a software program, wherein the broadcast information further shows correspondence between the reproduction programs and the contents, and also shows genres to which the contents belong, the reproduction program determining unit includes:

a storage unit for storing history information that shows history of genres to which contents having been viewed belong;

a contents identifying unit for identifying, by referring to the history information, genres that correspond to contents that have been viewed a predetermined number of times or more, and identity, by referring to the broadcast information, contents that belong to the identified genres, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs, wherein the contents identifying unit identifies, as viewing candidate contents, contents that are transmitted during a predetermined time period after the current time, among the viewing candidate contents identified by the contents identifying unit by referring to the broadcast information, the determining unit, when there are a plurality of candidate reproduction programs, determines preferentially a candidate reproduction program that corresponds to the highest number of viewing candidate contents, as the reproduction program to be cached, the reproduction program storage unit includes a volatile memory and a nonvolatile memory, the caching unit caches the reproduction program to either the volatile memory or the nonvolatile memory, and the caching unit detects activation duration for each received reproduction program, and stores preferentially into the nonvolatile memory a reproduction program having the longest activation duration.

6. The broadcast reception method of claim 5, wherein the second service period is before the first service period.

7. A broadcast reception apparatus for receiving contents and reproduction programs that correspond to types of the contents, and reproducing the contents by executing the reproduction programs, the broadcast reception apparatus comprising:

a receiving unit for receiving broadcast information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, the reproduction program determining unit includes:

a contents identifying unit for identifying, by referring to the broadcast information, contents that are to be transmitted over a channel which is currently used for transmitting a content, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs.

8. The broadcasting method of claim 7, wherein the second service period is before the first service period.

9. A broadcast reception apparatus for receiving contents and reproduction programs that correspond to types of the contents, and reproducing the contents by executing the reproduction programs, the broadcast reception apparatus comprising:

a receiving unit for receiving broadcast information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction, program in a reproduction program storage unit, wherein each reproduction program is a software program, wherein the broadcast information further shows correspondence between the reproduction programs and the contents, the reproduction program determining unit includes:

a contents identifying unit for identifying, by referring to the history information, contents that are to be transmitted over a channel to which a viewer subscribes, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs.

10. A broadcast reception apparatus for receiving contents and reproduction programs that correspond to types of the contents, and reproducing the contents by executing the reproduction programs, the broadcast reception apparatus comprising:

a receiving unit for receiving broadcast, information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, the reproduction program determining unit includes:

a contents identifying unit for identifying, by referring to the broadcast information, contents that are to be transmitted over one or more channels adjacent to a channel that is currently used, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among to candidate reproduction programs.

11. A broadcast reception apparatus for receiving contents and reproduction programs that correspond to types of the contents, and reproducing the contents by executing the reproduction programs, the broadcast reception apparatus comprising:

a receiving unit for receiving broadcast information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached, an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program, in a reproduction program storage unit, wherein each reproduction program is a software program, wherein the broadcast information further shows correspondence between the reproduction programs and the contents, and also shows genres to which the contents belong, the reproduction program determining unit includes:

a contents identifying unit for identifying, by referring to the broadcast information, contents that belong to a genre to which a content currently viewed belongs, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among the candidate reproduction programs.

12. A broadcast reception apparatus for receiving contents and reproduction programs that correspond to types of the contents, and reproducing the contents by executing the reproduction programs, the broadcast reception apparatus comprising:

a receiving unit for receiving broadcast information which shows for each content a first set of a first service period end a first channel during and over which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, the reproduction program determining unit includes:

a contents identifying unit for identifying, by referring to the broadcast information, contents to which a viewer subscribes, as viewing candidate contents;

a reproduction program identifying unit for identifying reproduction programs that correspond to the viewing candidate contents as candidate reproduction programs, by referring to the broadcast information; and a determining unit for determining the reproduction program to be cached, among to candidate reproduction programs.

13. A broadcast reception apparatus for receiving contents and reproduction programs that correspond to types of the contents, and reproducing the contents by executing the reproduction programs, the broadcast reception apparatus comprising:

a receiving unit for receiving broadcast information which shows far each content a first set of a first service period and a first channel during and ova which the content is transmitted, and also shows for each reproduction program a second set of a second service period and a second channel during and over which the reproduction program is transmitted;

a reproduction program determining unit for determining a reproduction program to be cached;

an identifying unit for identifying, by referring to the broadcast information, one or more sets of a service period and a channel during and over which the predicted reproduction program is to be transmitted after a current time; and a caching unit for allowing to receiving unit to receive the predicted reproduction program during and over the service periods and channels identified by the identifying unit, and store the received, predicted reproduction program in a reproduction program storage unit, wherein each reproduction program is a software program, wherein the broadcast information further shows correspondence between the reproduction programs and the contents, the reproduction program determining unit includes:
an input unit for receiving from a viewer a preselection of contents to be recorded;
a contents identifying unit for identifying, by referring to the broadcast information, the contents preselected by the viewer, as viewing candidate contents;
a reproduction program identifying unit for identifying reproduction programs that correspond to the viewing candidate contents as candidate reproduction programs, by referring to the broadcast information; and
a determining unit for determining the reproduction program to be cached, among the candidate reproduction programs.

14. A broadcast reception apparatus for receiving contents and reproduction programs that correspond to types of the contents, and reproducing the contents by executing the reproduction programs, the broadcast reception apparatus comprising:
a receiving unit for receiving broadcast information which shows for each content a first set of a first service period and a first channel during and over which the content is transmitted, and also shows for each reproduction program a second set of a second service period and a second channel during and over which the reproduction program is transmitted;
a reproduction program determining unit for determining a reproduction program to be cached;
an identifying unit for identifying, by referring to the broadcast information, one or more sets of a service period and a channel during and over which the predicted reproduction program is to be transmitted after a current time; and
a caching unit for allowing the receiving unit to receive the predicted reproduction program during and over the service periods and channels identified by the identifying unit, and store the received, predicted reproduction program in a reproduction program storage unit, wherein each reproduction program is a software program, wherein
the reproduction program storage unit includes a volatile memory and a nonvolatile memory,
the caching unit caches received reproduction programs to the nonvolatile memory, the broadcast reception apparatus further comprising
a memory control unit for storing predetermined reproduction programs stored in to nonvolatile memory into the volatile memory, and
the memory control unit identifies a reproduction program that has the longest activation duration among reproduction programs stored in the nonvolatile memory, and stores the identified reproduction program preferentially into to volatile memory.

15. A broadcast reception apparatus for receiving contents and reproduction programs that correspond to types of the contents, and reproducing the contents by executing the reproduction programs, the broadcast reception apparatus comprising;
a receiving unit for receiving broadcast information which shows for each content a first set of a first service period and a first channel during and over which the content is transmitted, and also shows for each reproduction program a second set of a second service period and a second channel during and over which the reproduction program is transmitted;
a reproduction program determining unit for determining a reproduction program to be cached;
an identifying unit for identifying, by referring to the broadcast information, one or more sets of a service period and a channel during and over which the predicted reproduction program is to be transmitted after a current time; and
a caching unit for allowing the receiving unit to receive the predicted reproduction program during and over the service periods and channels identified by the identifying unit, and store the received, predicted reproduction program in a reproduction program storage unit wherein each reproduction program is a software program, wherein
the reproduction program storage unit includes a volatile memory and a nonvolatile memory, and
the caching unit caches received reproduction programs in the volatile memory, the broadcast reception apparatus further comprising
a copying unit for copying predetermined reproduction programs from the volatile memory to the nonvolatile memory, and
the copying unit obtains activation duration for each reproduction program stored in the reproduction program storage unit, and copies preferentially a reproduction program having the longest activation duration.

16. A broadcast reception apparatus for receiving contents and reproduction programs that correspond to types of the contents, and reproducing the contents by executing the reproduction programs, the broadcast reception apparatus comprising:
a receiving unit for receiving broadcast information which shows for each content a first set of a first service period and a first channel during and over which the content is transmitted, and also shows for each reproduction program a second sets of a second service period and a second channel during and over which the reproduction program is transmitted;
a reproduction program determining unit for determining a reproduction program to be cached;
an identifying unit for identifying, by referring to the broadcast information, one or more sets of a service period and a channel during and over which the predicted reproduction program is to be transmitted after a current time; and
a caching unit for allowing the receiving unit to receive the predicted reproduction program during and over the service periods and channels identified by the identifying unit, and store the received, predicted reproduction program in a reproduction program storage unit, wherein each reproduction program is a software program, wherein
the reproduction program storage unit includes a volatile memory and a nonvolatile memory,
the caching unit caches received reproduction programs in the volatile memory, the broadcast reception apparatus further comprising
a copying unit for copying predetermined reproduction programs from the volatile memory to the nonvolatile memory, and
the shut-down unit identifies a reproduction program that has the longest activation duration among reproduction programs stored in the reproduction program storage unit, and stores the identified reproduction program preferentially into the nonvolatile memory.

17. The broadcast reception apparatus of claim 16, wherein the reproduction program storage unit includes a volatile memory and a nonvolatile memory, and the caching unit stores received reproduction programs into the nonvolatile memory, the broadcast reception apparatus further comprising a copying unit for identifying a reproduction program that has been stored the highest number of times by referring to the history information, and preferentially copy the identified reproduction program to the volatile memory.

18. A broadcast reception apparatus for receiving contents and reproduction, programs that correspond to types of the contents, and reproducing the contents by executing the reproduction programs, the broadcast reception apparatus comprising;

a receiving unit for receiving broadcast information which shows for each content a first set of a first service period and a first channel during and over which the content is transmitted, and also shows for each reproduction program a second set of a second service period and a second channel during and over which the reproduction program is transmitted;

a reproduction program determining unit for determining a reproduction program to be cached, an identifying unit for identifying, by referring to the broadcast information, one or more sets of a service period and a channel during and over which the predicted reproduction program is to be transmitted after a current time; and a caching unit for allowing the receiving unit to receive the predicted reproduction program during and over the service periods and channels identified by the identifying unit, and store the received, predicted reproduction program in a reproduction program storage unit, wherein each reproduction program is a software program, wherein the reproduction program determining unit includes:

a storage unit for storing history information that shows for each reproduction program a number of times the reproduction program was stored in the reproduction program storage unit by the caching unit;

a reproduction program identifying unit for identifying reproduction programs that have been stored a predetermined number of times or more by referring to the history information, and identify as candidate reproduction programs reproduction programs, among the reproduction programs that have been stored the predetermined number of times or more, that are shows in the broadcast information; and a determining unit for determining the reproduction program to be cached, among the candidate reproduction programs.

19. The broadcast reception apparatus of claim 18, wherein the reproduction program storage unit includes a volatile memory and a nonvolatile memory, and the caching unit stores received reproduction programs into the nonvolatile memory, the broadcast reception apparatus further comprising a copying unit for identifying a reproduction program that has been stored the highest number of times by referring to the history information, and preferentially copy the identified reproduction program to the volatile memory.

20. The broadcast reception apparatus of claim 18, wherein the reproduction program identifies as candidate reproduction programs, reproduction programs that have been stored the predetermined number of times or more; that are to be transmitted during a predetermined time period after the current time.

21. The broadcast reception apparatus of claim 20, wherein the determining unit, when there are a plurality of candidate reproduction programs, refers to the hit rate information and determines preferentially a reproduction program that has been stored the highest number of times, as the reproduction program to be cached.

22. The broadcast reception apparatus of claim 21, wherein the reproduction program storage unit includes a volatile memory and a nonvolatile memory, and the caching unit refers to the history information and stores preferentially a reproduction program that has been stored the highest number of times, into the volatile memory.

23. The broadcast reception apparatus of claim 21, wherein the reproduction program storage unit includes a volatile memory and a nonvolatile memory, and the caching unit refers to the history information and stores preferentially a reproduction program that has been stored the highest number of times, into the nonvolatile memory.

24. The broadcast reception apparatus of claim 20, wherein the reproduction program storage unit includes a volatile memory and a nonvolatile memory, and the caching unit stores received reproduction programs into the nonvolatile memory, the broadcast reception apparatus further comprising a shut-down unit operable to, when receiving an instruction to shut down the broadcast reception apparatus, check whether a reproduction program having the highest hit rate among reproduction programs stored in the reproduction program storage unit is stored in the nonvolatile memory, and when the reproduction program having the highest hit rate is not stored, shin down the broadcast reception apparatus after storing the reproduction program having the highest hit rate in the nonvolatile memory.

25. A broadcast reception method for a broadcast reception apparatus which receives contents and reproduction programs that correspond to types of to contents, and reproducing the contents by executing the reproduction programs, the broadcast reception method comprising the steps of:

receiving broadcast information which shows for each content a first set of a first service period and a first channel during and over which the content is transmitted, and also shows for each reproduction program a second set of a second service period and a second channel during and over which the reproduction program is transmitted;

determining a reproduction program to be cached;

identifying, by referring to the broadcast information, one or more sets of a service period and a channel during and over which the predicted reproduction program is to be transmitted after a current time; and allowing the receiving step to receive the predicted reproduction program during and over the service periods and channels identified by the identifying step, and store the received, predicted reproduction program in a reproduction program storage unit, wherein each reproduction program is a software program, wherein the broadcast information further shows correspondence between the reproduction programs and the contents, and also shows genres to which the contents belong the step of determining the reproduction program includes:

storing history information that shows history of genres to which contents having bean viewed belong;

identifying, by referring to the history information, genres that correspond to contents that have been viewed a predetermined number of tunes or more, and identifying, by referring to the broadcast information, contents that belong to the identified genres, as viewing candidate contents;

identifying reproduction programs that correspond to the viewing candidate contents as candidate reproduction programs, by referring to the broadcast information; and determining the reproduction program to be cached, among the candidate reproduction programs, wherein the contents identifying step identifies, as viewing candidate contents, contents that are transmitted during a predetermined time period after the current time, among the viewing candidate contents identified by the contents identifying step by referring to the broadcast information, and the determining step, when there are a plurality of candidate reproduction programs, determines preferentially a reproduction program having the longest activation duration as the reproduction program to be cached.

* * * * *

UNITED STATES PATENT AND TRADEMARK OFFICE
CERTIFICATE OF CORRECTION

PATENT NO. : 7,165,265 B2
APPLICATION NO. : 09/797235
DATED : January 16, 2007
INVENTOR(S) : Mori et al.

It is certified that error appears in the above-identified patent and that said Letters Patent is hereby corrected as shown below:

Claim 3, Column 41, line 36, "to" should be --the--.
Claim 3, Column 42, line 4, "identity" should be --identify--.
Claim 3, Column 42, line 20, after "unit" insert --,--.
Claim 3, Column 42, line 28, "to" should be --the--.
Claim 4, Column 42, line 33, "to" should be --the--.
Claim 5, Column 42, line 37, "to" should be --the--.
Claim 5, Column 42, line 41, "fist" should be --first--.
Claim 5, Column 43, line 5, "identity" should be --identify--.
Claim 10, Column 45, line 10, after "wherein", a new paragraph should begin.
Claim 10, Column 45, line 24, "to" should be --the--.
Claim 12, Column 26, line 8, "end" should be --and--.
Claim 13, Column 46, line 46, "far" should be --for--.
Claim 13, Column 46, line 47, "ova" should be --over--.
Claim 15, Column 48, line 9, after "unit" insert --,--.
Claim 18, Column 49, line 19, "," should be --;--.
Claim 18, Column 49, line 43, "shows" should be --shown--.
Claim 24, Column 50, line 26, "shin" should be --shut--.
Claim 25, Column 50, line 31, "to" should be --the--.

Signed and Sealed this

Tenth Day of April, 2007

JON W. DUDAS
*Director of the United States Patent and Trademark Office*